Dec. 6, 1966    F. L. MERGNER ETAL    3,290,443
RECEIVERS OF STEREOPHONIC PROGRAMS FROM A SINGLE
MULTIPLEX TRANSMITTING STATION
Filed July 16, 1964    9 Sheets-Sheet 1

INVENTORS
F. L. MERGNER
H. K. HEINZ
BY
ATTORNEY

Dec. 6, 1966   F. L. MERGNER ETAL   3,290,443
RECEIVERS OF STEREOPHONIC PROGRAMS FROM A SINGLE
MULTIPLEX TRANSMITTING STATION
Filed July 16, 1964   9 Sheets-Sheet 2

INVENTORS
F. L. MERGNER
H. K. HEINZ
BY
Henry L. Burkitt
ATTORNEY

INVENTORS: F. L. MERGNER
H. K. HEINZ
BY Harry L. Burkitt
ATTORNEY

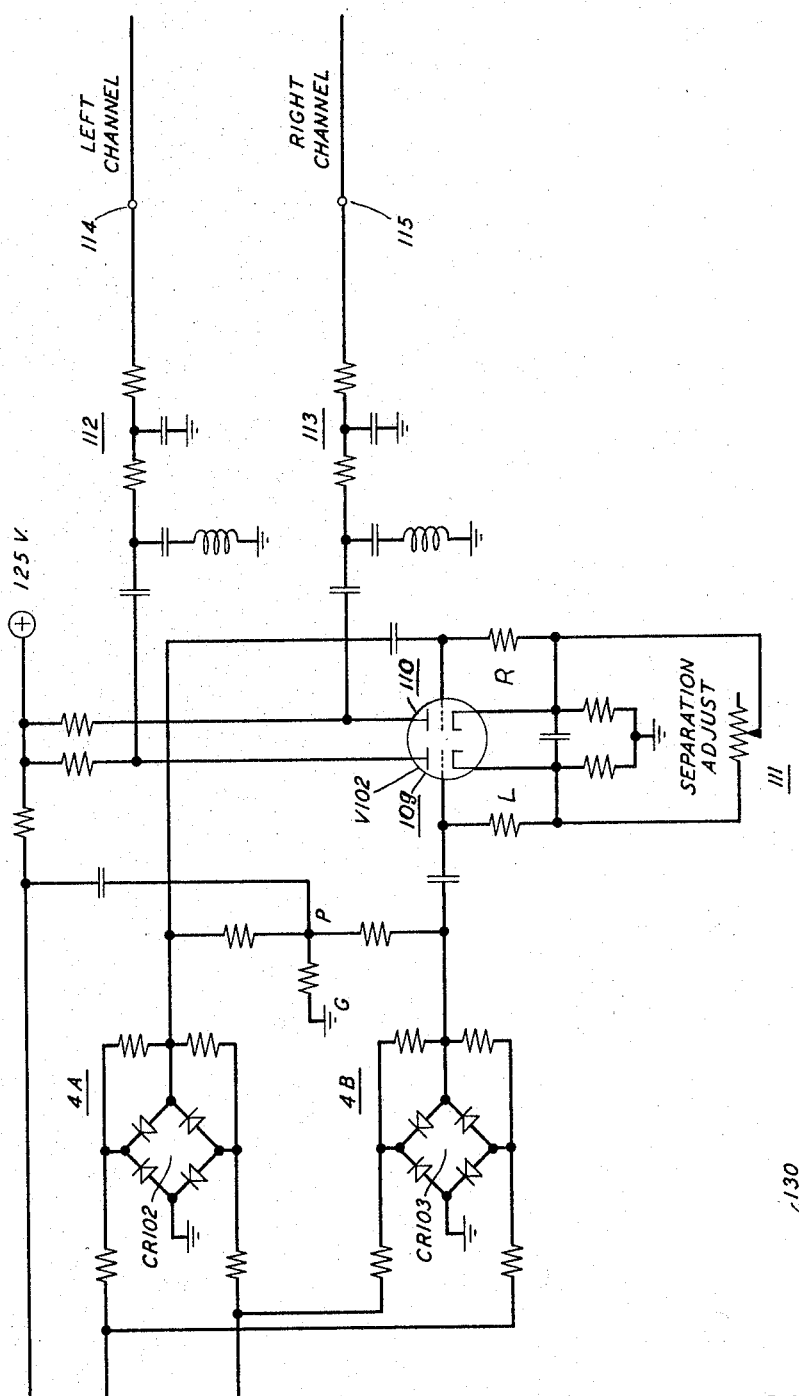

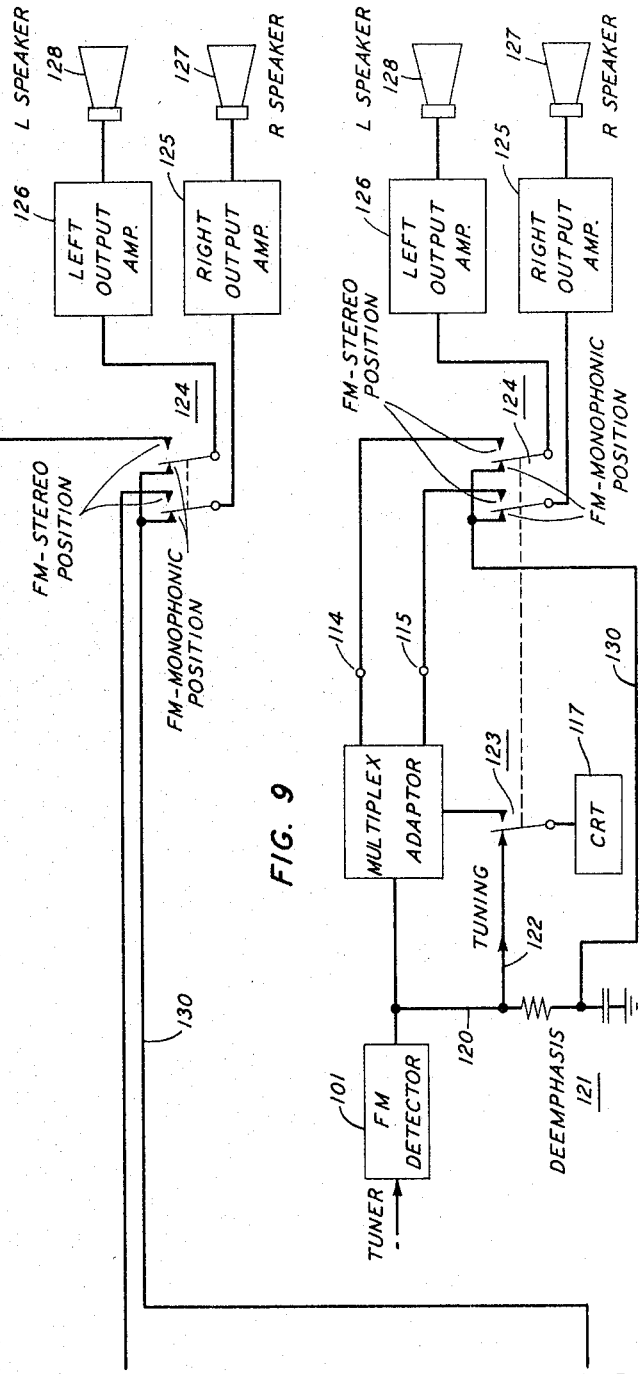

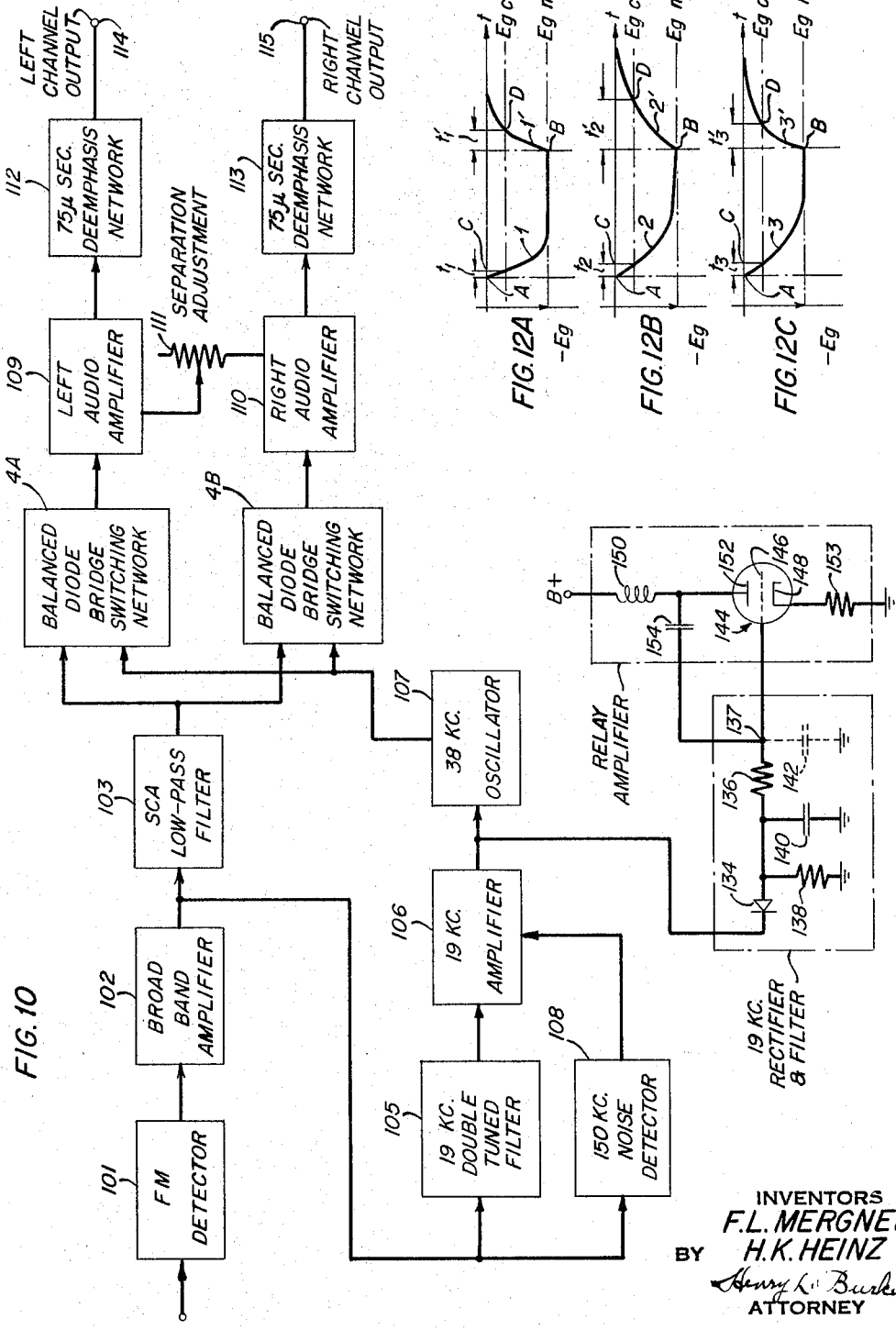

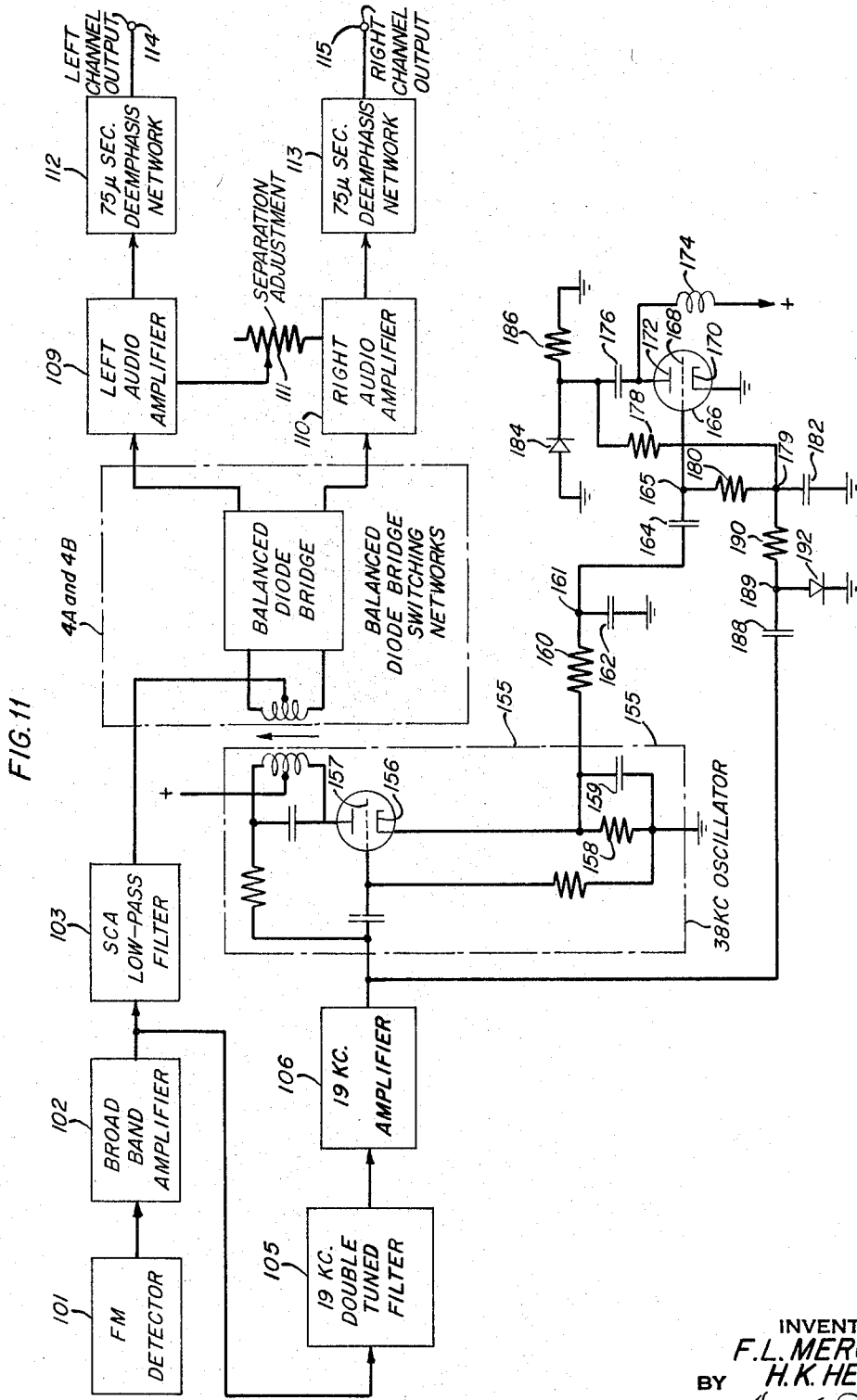

United States Patent Office 3,290,443
Patented Dec. 6, 1966

1

3,290,443
RECEIVERS OF STEREOPHONIC PROGRAMS FROM A SINGLE MULTIPLEX TRANSMITTING STATION
Fritz L. Mergner, Beechhurst, and Harro K. Heinz, Flushing, N.Y., assignors to Fisher Radio Corporation, Long Island, N.Y., a corporation of New York
Filed July 16, 1964, Ser. No. 383,056
22 Claims. (Cl. 179—15)

This invention relates to receivers of stereophonic programs from a single multiplex transmitting station.

The present application is a continuation-in-part of the applications of F. L. Mergner and H. K. Heinz, Serial No. 157,477, filed December 6, 1961, and Serial No. 181,681, filed March 22, 1962, both now abandoned.

The invention may have application in connection with various methods of transmission. In the instance here being described, the present day application to stereophonic transmission of FM signals is considered, but is not intended to be limiting unless so stated. In connection with transmitting and reception of stereophonic programs, there is the transmission of a pilot carrier which is received together with the stereophonic signals (L, R), and used to generate a sub-carrier frequency which is used to demodulate the ($L-R$) sub-carrier information. This pilot carrier is present only during the transmission of stereophonic programs, but is absent when the station is transmitting a monophonic program. In the description here, the standard frequency presently used, namely, 19 kc., will be considered, but it is to be understood that other frequencies are available, that there are some technical considerations which determine such frequencies which considerations need not be considered here.

An object of the invention is to discriminate between stereophonic and monophonic program transmissions, and to indicate, either visually, or otherwise, the particular mode of transmission effective at the time in the program receiver.

Another object of the invention is to provide an automatic indicator, activated by a receiver pilot carrier frequency, operating to give a signal, visual or otherwise, to discriminate between stereophonic and monophonic transmissions in such a receiver, as, for instance, in connection with an FM receiver.

Another object of the invention is to provide an automatic circuit changing means and indicator, activated by a received pilot carrier frequency, to discriminate between stereophonic and monophonic transmissions in receivers, such as in connection with FM receivers.

A further object of the invention is to provide, for conjunct action with means to indicate the presence of a stereophonic transmission, with or without automatic means for changing the circuit, where such means is activated by a received pilot carrier frequency to discriminate between stereophonic and monophonic transmissions in receivers, where such indicating means, as well as the circuit changing means, when present, is responsive only to the presence of the received pilot carrier frequency, means to bar activation by signals which transiently may be of the frequency of the pilot carrier during monophonic transmissions.

It is another object of the invention to provide, with such means for indicating the presence of a stereophonic transmission, with or without means for automatically changing the circuit, means which will be activated by a received pilot carrier frequency to discriminate between stereophonic and monophonic transmissions in receivers, and to make such indicating and circuit changing means effective even if the pilot carrier frequency is poorly received by reason of poor pilot signal transmission or adverse conditions at the receiver.

2

It is another object of the invention to provide such automatic circuit changing and indicating means, activated by a received pilot carrier frequency to discriminate between stereophonic and monophonic transmissions at the receiver, where the automatic means is responsive only when the pilot carrier frequency is present in the received signal, and is not activated by signals of the frequency of the pilot carrier which may transiently appear, from time to time, in monophonic transmissions, and where the automatic means is effective in operation even if the pilot carrier frequency is poorly received by reason of poor pilot signal transmission or adverse conditions at the receiver, and has the desired rapid reaction to the presence of the proper pilot carrier frequency for changing from monophonic to stereophonic reception, where automaticity is involved, and vice versa.

Another object of the invention is to provide a stereophonic receiver, such as an FM receiver, wherein the received pilot frequency simultaneously stabilizes a synchronizing sub-carrier oscillator and activates the indicator of the stereophonic program.

A feature of the invention is a discriminator circuit and an indicator, as, for instance, a visual indicator, for received stereophonic and monophonic modes, which are responsive to the presence of a pilot carrier accompanying the stereophonic program.

In another aspect of the invention, time constant and feedback factors in the discriminator circuit are used to insure that the discriminator circuit responds only in accordance with relation to the positive presence of the necessary pilot carrier in the received signal, or its complete absence, and does not respond to spurious signals which may transiently have the frequency of the pilot carrier.

For certain purposes of the invention, an amplitude modulation detector may be employed in a discriminator circuit to insure that the discriminator responds only when the desired steady pilot carrier of the selected amplitude is present in the received signal, and rejects any signals which transiently have a frequency substantially that of the pilot carrier.

Another feature of the invention may be a combining matrix for $L+R$, and $L-R$, stereophonic signals, and a means, such as a switch, for cutting out the $L-R$ signals in response to the reception of the pilot carrier.

Another feature of the invention is an indicator, as, for instance, a visual indicator circuit, for stereophonic and monophonic mode receivers, such as in connection with FM receivers, which is immune to the noise spectrum present when the receiver is being manipulated, in turning between stations.

One embodiment to be described involves a stabilized discriminator circuit, with a cathode beam indicator for the stereophonic and monophonic modes, which are activated by the reception of a transmitted pilot carrier accompanying the stereophonic program.

Thus, such indicator, the embodiment shown being of a visual cathode ray indicator for stereophonic and monophonic mode receivers, such as in connection with FM receivers, as here disclosed, is made immune to the noise and hiss present when the receiver is tuned between stations.

Various multiplex systems are capable of achieving the transmission of stereo programs over a single transmitting station, as, for instance, a single FM station. These systems differ mainly in the type of information transmitted through main and subcarrier frequencies, and the manner in which the subcarrier is modulated. In the various systems proposed, some employ the sum of the left and right channels ($L+R$) to modulate the main carrier, and the difference between left and right channels ($L-R$) to modulate the subcarrier. The particular difference between these systems is the type of modulation used for the subcarrier. In one system, for instance, there may be involved frequency-modulation of a 50 kc. carrier. In another case, there may be involved double-sideband AM modulation, as, for instance, of a 38 kc. suppressed carrier, which in turn frequency-modulates the main carrier.

In the specific example here considered, the monophonic signal, comprising the sum of left and right channels $(L+R)$, during stereophonic transmission, is available without further demodulation at the discriminator or ratio-detector output of an FM receiver tuner. Several different methods, however, may be employed to recover the $L-R$ subcarrier information. Either time-division multiplex, or AM detectors of various types, may be used to recover this information. In an audio matrix, using a resistive sum and difference network, the final L and R channels are derived, and, after proper de-emphasis, fed to an audio amplifier. In addition to the stereophonic program, this multiplex system permits the transmission of an SCA channel for background music and similar information.

In an embodiment here being considered, the FM multiplex system involved is of the type wherein transmitters of stereophonic programs customarily employ $L+R$ channels to modulate a main carrier, and the difference between left and right channels $(L-R)$ to modulate the subcarrier. One of the types of modulation presently being used for the subcarrier is double sideband AM modulation of a 38 kc. suppressed carrier, which in turn frequency-modulates the main carrier.

In an embodiment of the invention here being described, a pilot carrier transmitted from a single multiplex FM station in a stereophonic program is received and detected in the FM receiver, is thence filtered by highly selective tuned circuits, and is then amplified to activate a relay switch. During stereophonic transmissions only, the relay switch connects any suitable indicator, as, for instance, a light bulb, for actuation, as, for instance, by a suitable voltage source. The bulb may be illuminated or other signal means actuated, to indicate automatically to the listener that a stereophonic program is being received. During monophonic programs, the same relay disconnects the indicating means, owing to the absence of the pilot carrier, and shorts out a connecting link circuit between the stereophonic output and the subcarrier circuit.

One practical problem arises, stemming from the high noise level picked up by receivers, such as FM receivers, when tuned between stations. With sensitive tuners, this level can be considerably higher in amplitude than the specific pilot carrier. Therefore, means must be provided to prevent the noise level from triggering the indicator and switching circuit. Noise immunity can be achieved by extracting, from the noise band, a frequency spectrum normally not used for transmitting the broadcasting information, thence rectifying it, and blocking an amplifier tube operating the indicator circuits.

In accordance with another embodiment of the present invention, a pilot carrier transmitted from a time-division multiplex FM station in a stereophonic program broadcast is received and detected in the FM receiver, thence filtered by sharply tuned circuits, and amplified to activate the indicator, which may be a cathode-ray indicator, and also to stabilize the subcarrier oscillator concomitantly. During stereophonic transmissions only, the indicator such as the cathode-ray beam indicates automatically to the listener the reception of a stereophonic program. During monophonic programs, the indicator is not activated owing to the absence of the pilot carrier.

In this instance, noise immunity for the indicator likewise can be achieved by extracting from the noise spectrum a frequency normally not used for transmitting the broadcasting and SCA information, thence rectifying it, and blocking a pilot carrier amplifier operating the indicator circuit.

Another object of the invention is to prevent undesired changing from one mode of operation of the receiver, such as the monophonic mode, to the stereophonic mode of operation, under spurious circumstances, as, for instance, when the transmission is monophonic and is not intended to include a frequency component the same as that of the pilot carrier. Such changing may be caused by transient signals of the frequency of the pilot carrier which may be present in the output of the FM transmitter. For example, such transient signals may appear as harmonics of voice or musical broadcasts.

Concomitant with this problem of undesired changing from the monophonic mode to the stereophonic mode because of spurious signals of the pilot carrier frequency is the failure to change from the monophonic mode to the stereophonic mode of operation when a stereophonic transmission is being received, but where such stereophonic transmission contains a poor pilot carrier signal, as for instance, one which is amplitude modulated. This failure may arise from the use of improper equipment in transmission, or from being degraded by adverse reception conditions.

It is sought to solve these problems without sacrificing the necessary practicable speed in proper changing. In other words, it is proposed here to devise automatic means for changing back and forth between the monophonic and stereophonic modes of operation only when the proper conditions require such changing, and at the same time assuring a desired speedy response when such changing manifestation is necessary, and only then.

In one embodiment to be described, a relay switch has associated therewith a time constant and feedback arrangement which causes action by the switching means only in response to the transition from the absence to the presence of a received pilot carrier frequency, and in response to the transition from the presence to the absence of such a received pilot carrier frequency.

In another embodiment to be described, a relay switch has associated therewith an amplitude modulation detector which operates to detect whether the received signal has as a component a pilot carrier frequency of at least a minimum amplitude, thus so only on detection of such a pilot carrier frequency will the relay switch cause switching from the monophonic mode to the stereophonic mode of operation. Disappearance of such a received pilot carrier frequency component of at least this minimum amplitude will cause the relay switch to resume a position to where the receiver will function in the monophonic mode of operation.

Other objects of the invention will be set forth hereinafter, or will be apparent from the description and the drawings, in which are illustrated embodiments exemplifying the invention.

The invention, however, is not intended to be restricted to any particular construction, or any particular arrangement of parts, or any particular application of any such construction or arrangement of parts, or any specific method of operation or use, or any of the various details thereof, even where specifically shown and described herein, as the same may be modified in various particulars, or may be applied in many varied relations, without departing from the spirit and scope of the claimed invention, of which the exemplifying embodiments, herein shown and described, are intended only to be illustrative, and only for the purpose of complying with the requirements of the statutes for disclosure of operative embodiments, but not to show all the various forms and modifications in which the invention might be embodied.

In the drawings, which disclose typical and practical constructions,

Figures 1, 2:
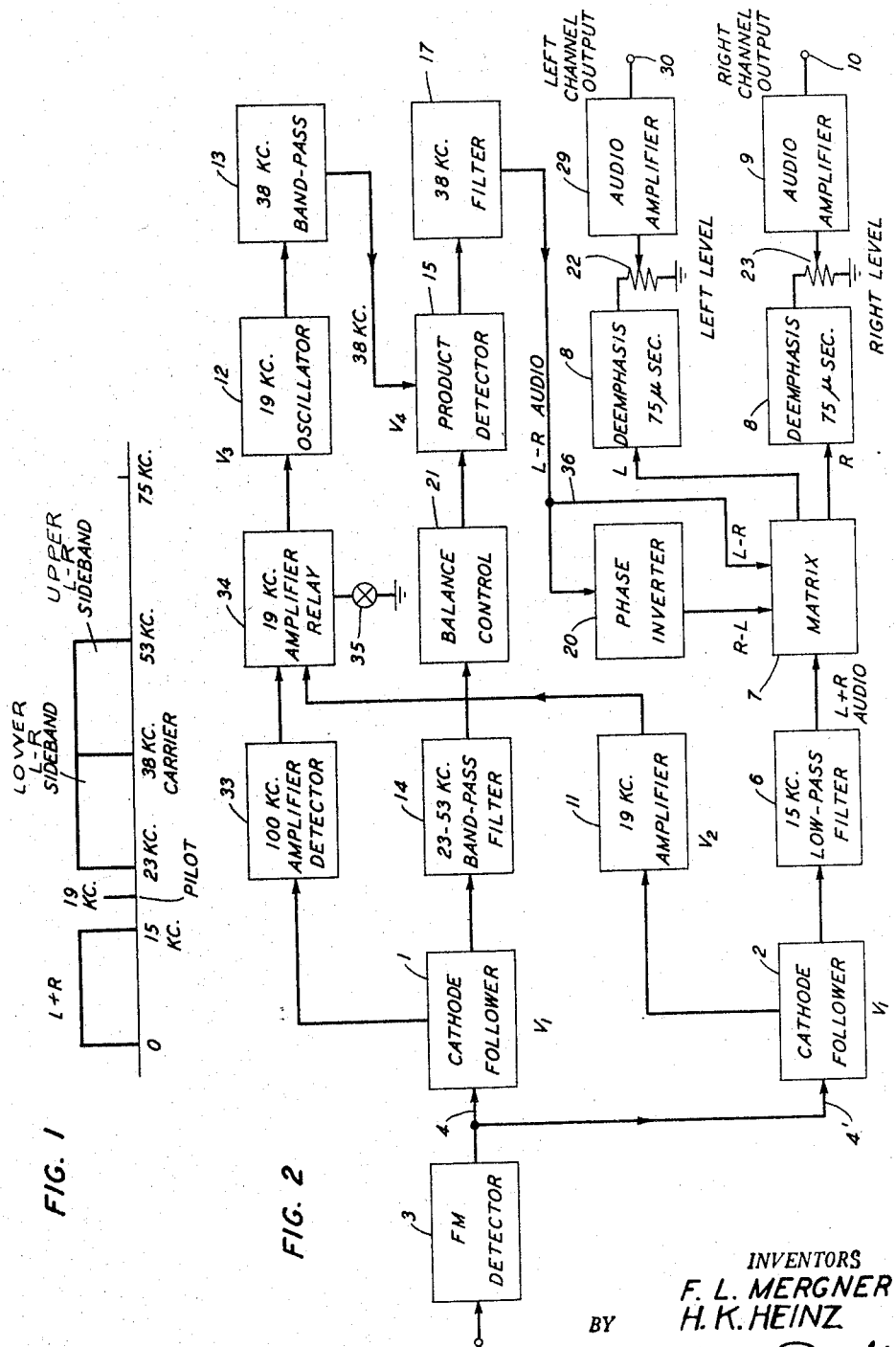
FIG. 1 is a view to illustrate a frequency spectrum of an FM stereophonic broadcast in accordance with the invention.
FIG. 2 is a view to illustrate, in a block diagram, a stereophonic FM multiplex receiver circuit, in accordance with the invention, operated by the FM detector.
Figure 3:
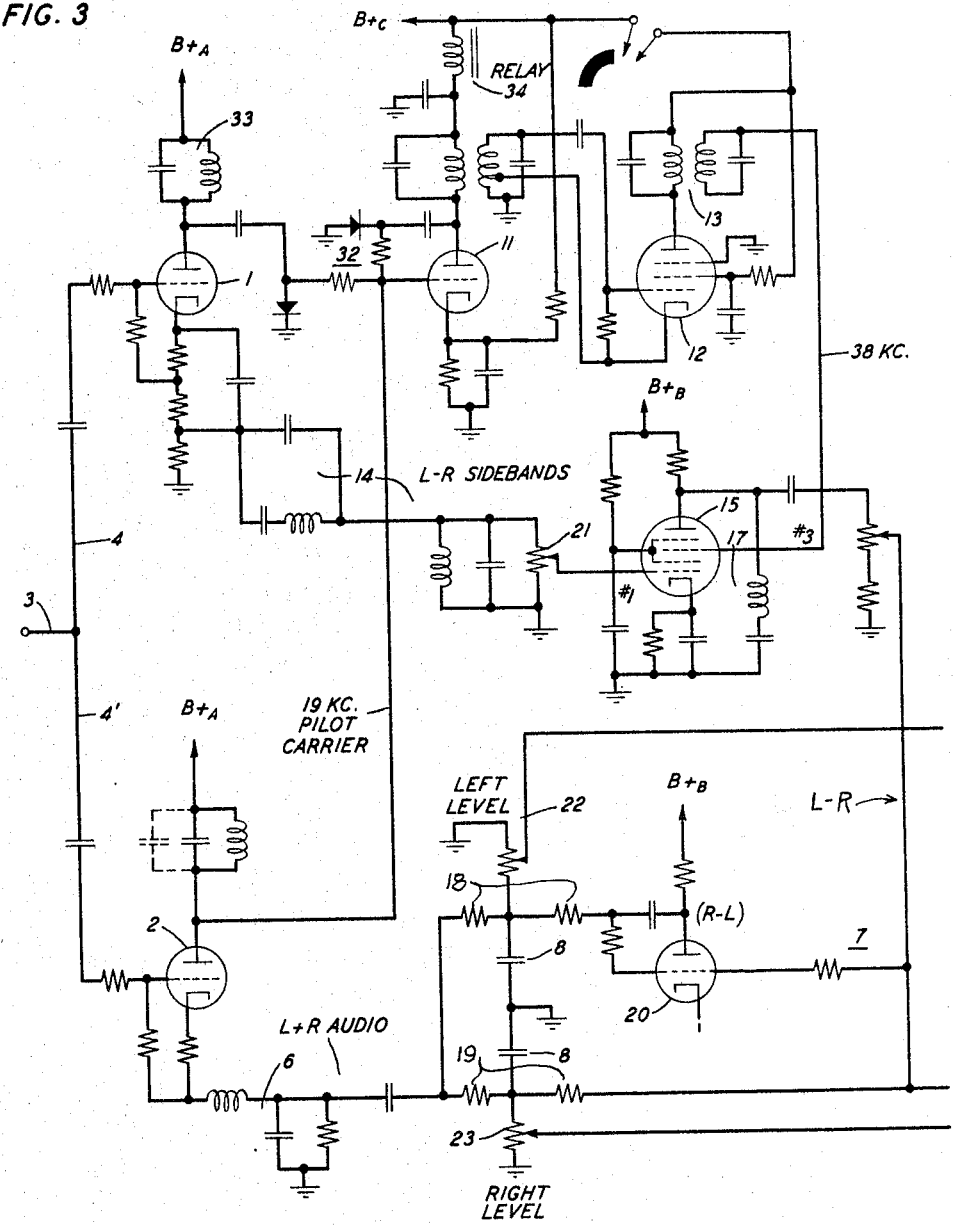
Figure 4:
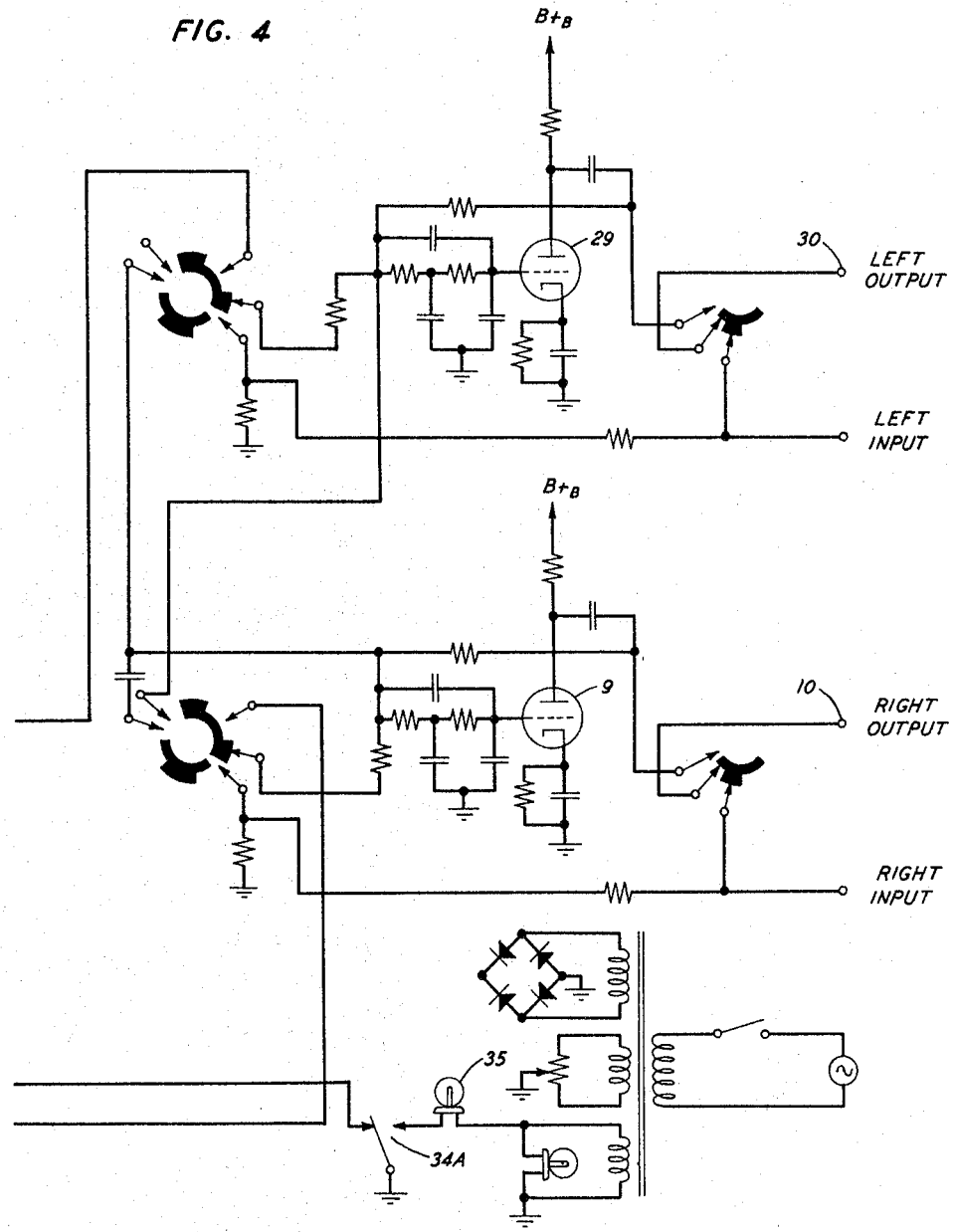
Figure 5:
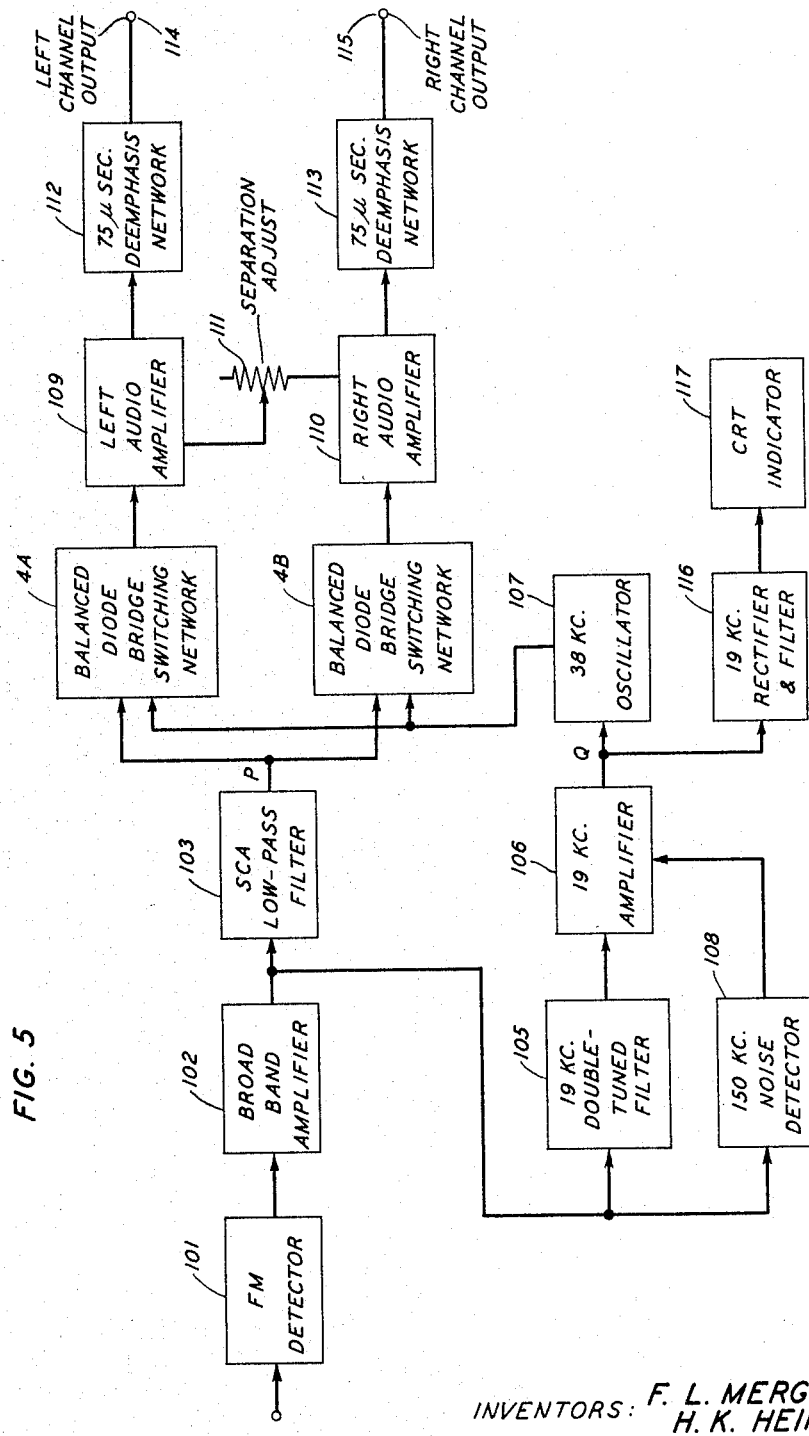
Figure 6:
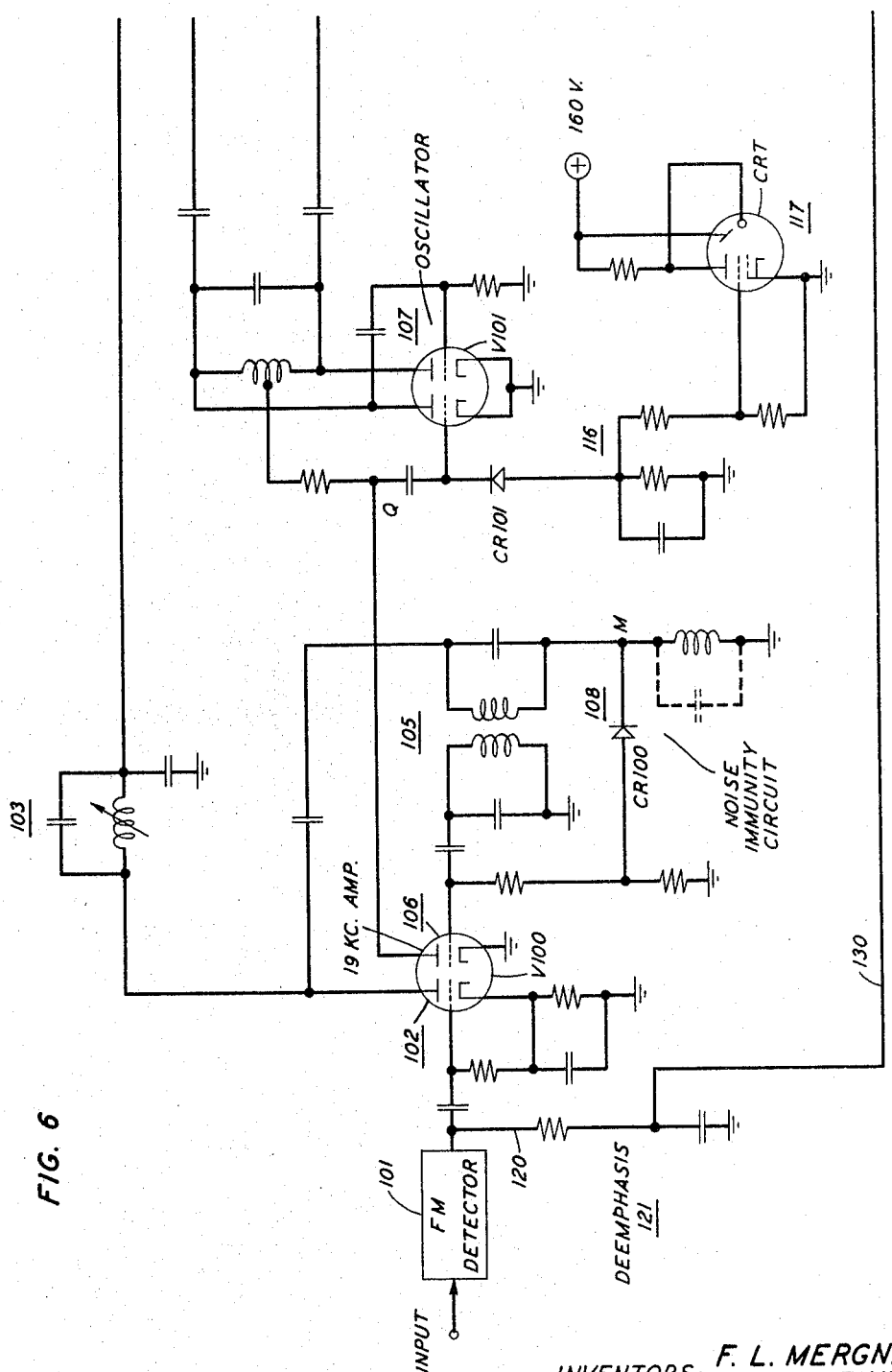

FIGS. 3 and 4 conjointly show a schematic circuit diagram corresponding to the block diagram of FIG. 2, the lefthand end of FIG. 4 joining with the righthand end of FIG. 3;

FIG. 5 is a block diagram to illustrate a stereophonic time-division multiplex receiver having a cathode-ray indicator in accordance with the invention;

FIGS. 6 and 7 jointly illustrate a schematic circuit diagram corresponding to the block diagram of FIG. 5, the righthand end of FIG. 6 joining the lefthand end of FIG. 7; and FIG. 8 is a diagrammatic view of a portion of a circuit which is to be joined to that shown in FIG. 7, depicting certain circuit elements for switching the stereophonic and monophonic modes in association with the tuning and loudspeaker circuits of the FM receiver shown in FIGS. 6 and 7;

FIG. 9 is a diagrammatic view to illustrate a block schematic of a modified multiplex receiver and cathode beam indicator system; and FIG. 10 is a schematic diagram to depict an embodiment of a stereophonic receiver operation which has a mode switching arrangement responsive substantially only to the presence of a received component of the pilot carrier frequency to result in placing the receiver in proper stereophonic operation;

FIG. 11 is a schematic diagram of another embodiment of a stereophonic receiver, with a switching arrangement which is responsive substantially only to the presence of a received component of the pilot carrier frequency of at least a minimum amplitude to result in placing the receiver in proper stereophonic operation; and FIGS. 12A, 12B and 12C together comprise a comparison of the timing diagrams of waveforms which occur in prior art switching arrangements, and in the arrangement depicted in FIG. 10.

Referring to the modification illustrated by the block diagram of FIG. 2, and the schematic diagram of FIGS. 3 and 4, a signal from the tuner in FM detector 3 may be passed to two cathode follower circuits 1 and 2 in parallel branches 4 and 4'.

The L+R audio signals are separated by low pass filter 6 in branch 4' after passage through cathode follower 2. A balanced audio matrix network 7, using a resistive sum and difference circuit arrangement or arms 18 and 19, derives the R channel by combining the L+R signal with the R−L signal. After proper deemphasis in network 8, the R channel is fed to an audioamplifier 9 from which the right channel output apepars at terminal 10.

In the plate circuit of cathode follower 2, the pilot carrier, as, for instance, 19 kc., is separated out and amplified by high-gain amplifier 11. The amplified pilot carrier (19 kc.) synchronizes a 19 kc. Hartley oscillator 12, whose double-tuned plate circuit 13 filters out the (second harmonic) 38 kc. sub-carrier frequency required for the detection of the L−R sidebands.

A band pass filter 14, as, for instance, 23–53 kc., connected to cathode follower circuit 1, permits only the L−R sidebands centered about the 38 kc. to reach grid No. 1 of product detector tube 15. At the output of product detector tube 15, a sharp series tuned filter 17 removes the 38 kc. carrier, and only the demodulated L−R audio signals are passed to one arm 18 of resistive matrix network 7. The other arm 19 receives an inverted (R−L) signal of equal amplitude through a wide-band phase inverter stage 20.

Network 8, which may be a 75 micro sec. deemphasis network, separating both sections of balanced matrix 7, equalizes the frequency response, and removes any remainder of the 38 kc. carrier.

Careful alignment of all tuned circuits, and correct setting of balance control 21, during production, as well as the selection of close-tolerance parts, will ensure equal levels, and minimum phase shift between main and sub-carrier modulation frequencies. This is of importance because only 3 degrees of phase difference, and 0.3 db of amplitude variations between the main channel signal and the subcarrier sideband envelope, will result in not more than 29.7 db of separation. These, for example, are the values which stations presently maintain during stereo multiplex transmissions. It is only natural that the stereophonic adapter presently be designed in such a way as not to deteriorate from the present figure, as stated above for stereo separation.

A suitable signal may be actuated whenever a station transmits a stereophonic program. In this case, the signal takes the form of a front panel light 35 which is lighted to indicate the transmission of the stereophonic program. Reverting back to the block diagram of FIG. 2, it can be seen that this light may be connected to amplifier 11, which in this case is 19 kc., and relay 34. The pilot carrier, transmitted only during stereo programs, activates relay 34, which in turn switches on light 35. Relay switch 34A opens the L−R audio channel 36 connected to matrix network 7.

When tuning from station to station, the signal is actuated, in this case lamp 35 is lighted, only when a stereo program is on the air. There is no need to switch back and forth between monophonic and stereo positions on the amplifier, and listen to the speakers, to determine the nature of a program. The switch, therefore, can be left in the FM stereo position at all times, and the signal automatically will indicate correctly. During stereo transmissions, the signal goes on, the switch is open, and the L−R signals will reach matrix network 7, to form, together with L+R signals, the final L, R, stereo output information.

During monophonic operation, however, the missing 19 kc. carrier cannot activate relay 34. The signal, as, for instance, light 35, is off, L−R channel relay switch 34A is closed, and only L+R monophonic signals will reach output terminal 10.

When tuning between stations, hiss and noise may be high enough in amplitude to activate relay 34 in the same way as does the pilot carrier. To prevent relay 34 from being affected by this noise, a portion of it is amplified in an amplifier-detector stage 33, which may be tuned, for instance, to 100 kc., rectified, and fed to a bridge circuit 32 where it blocks the relay tube of amplifier 11 completely. On station, the noise disappears and the voltage derived from the rectified 19 kc. pilot carrier is high enough to unblock amplifier 11.

Product detector tube 15, illustrated in FIG. 3, may be used to obtain superior performance. In the detection process, it is desirable that product detector tube 15 have two separate grids and linear Vg./Ipl. characteristics. The subcarrier of 38 kc. may be fed to one grid, the L−R sidebands to another. As long as the requirements on the detector linearity are met, no demodulation of interfering frequencies will occur. In practice, however, some slight deviation from a perfectly straight characteristic is unavoidable, which might lead to a small amount of cross-modulation between the subcarrier and SCA channels. In spite of these practical limitations, the degree of selectivity afforded by the product detector will be found to be superior to other methods of detection. Filter 14 may be a simple two section filter having a bandpass from 23 to 53 kc. (FIG. 2) for the L−R sidebands to provide sufficient cross-talk protection. In addition, the series arm of bandpass filter 14 may be tuned to an anti-resonance at 67 kc., the center frequency of the SCA channel, to steepen the response of this filter at frequencies above 53 kc.

The demodulation process in product detector tube 15 may be illustrated mathematically in the following. The composite stereophonic signal available at the multiplex output of an FM tuner is:

$$E(t) = [A(t) + B(t)] + [A(t) - B(t)] \cos st \quad (1)$$

where $A(t)$ = instantaneous left channel signal,
$B(t)$ = instantaneous right channel signal,
$s = 2\pi f_s$ ($f_s$ = 38 kc.)

The 23 kc. to 53 kc. band-pass filter 14 passes the $A-B$ information only; therefore the signal at grid No. 1 of the product detector is:

$$[A(t)-B(t)] \cos st \quad (2)$$

Signal at grid No. 3 of product detector: $\cos st$ (3)

Product of both signals = $\cos 2 st[A(t)-B(t)]$ (4)

$$= \frac{1+\cos 2 st}{2}[A(t)-B(t)]$$

$$= \underline{[A(t)-B(t)]} + \frac{\cos 2 st}{2}[A(t)-B(t)]$$

(5)

The underlined portion of this equation, containing the second harmonic of $s$, can be filtered out.

Because of 180° phase reversal in the product detector tube, the remaining demodulated signal becomes:

$$-\tfrac{1}{2}[A(t)-B(t)] \quad (6)$$

This signal is then matrixed directly, and also is 180° out-of-phase with the $L+R$ signal, to produce the final stereophonic information, as previously described.

The modified system shown in FIGS. 5, 6 and 7 discloses an FM receiver of stereophonic and monophonic programs making use of time-division multiplex demodulation. The indicator shown is a cathode-ray beam indicator.

Referring to the block diagram of FIG. 5 and the schematic diagram of FIGS. 6 and 7, a signal from the tuner in an FM detector 101 may be passed to broadband amplifier 102. An SCA lowpass filter 103 may be connected to broadband amplifier 102 to permit only the monophonic and stereo multiplex signals to reach left and right audio amplifiers 109 and 110. A single positive voltage, here indicated as 125 volts, may be used for the plate voltages of amplifiers 102, 109 and 110. Any suitable voltage may, of course, be used according to the various factors of the circuit. SCA channel signals, which may be transmitted along with the stereo multiplex signals on some FM stations, may be filtered out by filter 103.

A 19 kc. double-tuned filter 105 may be used to allow only the 19 kc. pilot carrier, transmitted with the stereo multiplex signals, to reach a 19 kc. amplifier 106. The output signal from 19 kc. amplifier 106 may be employed to synchronize 38 kc. oscillator 107 so that the oscillator output signal frequency is exactly the same as, and precisely in phase with, the suppressed 38 kc. carrier of the transmitter (not shown).

The output signal from 38 kc. oscillator 107 may be fed to balance diode bridges 4A and 4B, the diodes of which are indicated as CR102 and CR103, respectively, to cause them to conduct and non-conduct alternately at a 38 kc. rate. The stereo multiplex signals from filter 103 may be applied to the grids of audio amplifiers 109 and 110. When the 38 kc. output signal from oscillator 107 causes balanced diode bridge 4A to be in a conducting state, and diode bridge 4B to be in a non-conducting state, the stereo multiplex signals are permitted to reach the grid of audio amplifier 109(L), but at the same time are shorted to ground through bridge 4A, and consequently are prevented from reaching the grid of audio amplifier 110(R). One-half of a 38 kilocycle later, oscillator 107 causes diode bridge 4A to be in the non-conducting state, and diode bridge 4B to be in the conducting state. The stereo multiplex signals are now allowed to reach the grid of audio amplifier 110, and are prevented from reaching the grid of audio amplifier 109. In this manner, the stereo multiplex signals are sampled at a 38 kc. rate, and routed to the proper audio amplifier 109 or 110.

The output of left audio amplifier 109 may be passed through a standard 75 microsecond deemphasis network 112 to the left channel output terminal 114; and the output of the right audio amplifier 110 is passed through a 75 microsecond deemphasis network 113 to right channel output terminal 115.

The 38 kc. sampling process, as just described, achieves approximately 10 db separation between left and right signals at the grids of the audio amplifiers. Separation adjustment potentiometer 111, connected between the cathodes of the two audio amplifiers, mixes the left (L) and right (R) signals out-of-phase to increase separation to more than 35 db. The adjustment potentiometer is factory-set to permit just enough out-of-phase cross-mixing to cancel the in-phase cross-mixing resulting from the sampling process.

Referring to the schematic circuit diagram of FIGS. 6 and 7, a signal from the tuner in detector 101 is transmitted through amplifier 102.

In the plate circuit of tube V100 of amplifier 102, the 19 kc. pilot frequency is separated out by filter 105 which may have a sharp transmission peak at 19 kc.; this pilot is further amplified by amplifier 106.

The amplified pilot frequency (19 kc.) synchronizes oscillator 107 with the corresponding transmitter-oscillator (not shown).

The output signal from tube V101 of oscillator 107 is fed to the balanced diode switching networks 4A and 4B to cause the diode bridges alternately to conduct and to be blocked. When the 38 kc. output signal from oscillator 107 causes diode bridge 4A to be in a conducting state, and diode bridge 4B to be blocked or non-conducting, the stereophonic multiplex signals are permitted to reach the grid of audio amplifier 109(L), but are prevented from reaching the grid of audio amplifier 110(R).

Similarly, the stereo multiplex signals are separated with respect to the L and R amplifiers 109 and 110 by the action of the 38 kc. oscillation, one-half of a cycle later. In this manner, the stereophonic multiplex signals are sampled at a 38 kc. rate, and are routed to the proper L and R amplifiers 109 and 110, respectively.

The output of audio amplifier 109(L) is passed through 75 microsecond deemphasis network 112 to left channel output terminal 114, while the output of audio amplifier 110(R) is similarly passed through deemphasis network 113 to output terminal 115, representing the right (R) channel.

An indicator, such as front panel cathode ray indicator 117, may be activated whenever a station transmits a stereophonic program. A plate voltage of 160 volts is indicated (FIG. 6) for the cathode ray tube of indicator 117; it is obvious that any proper voltage, according to the values of the other parts of the circuit, may be applied. Reverting back to the block diagram (FIG. 5), it can be seen that CRT indicator 117 is connected to amplifier 106. The 19 kc. pilot carrier, transmitted only during stereophonic programs, activates cathode-ray beam indicator 117.

When tuning from station to station, the indicator is automatically actuated only when a stereo program is on the air. The advantages thereof are clearly perceived. It is not necessary to switch back and forth between monophonic and stereophonic positions, and to listen to the loud speakers to determine the nature of the program. During monophonic operation, the 19 kc. pilot is missing; therefore, indicator 117 is not activated.

Referring to FIG. 6, the output signal at point Q from amplifier 106 is also applied to the rectifier CR101 associated with filter 116. The negative D.C. voltage from rectifying diode CR101 is fed as a bias potential to the grid of cathode beam indicator 117, which may utilize an EM84A tube having a fluorescent screen. Thus the presence of the pilot frequency causes the bright cathode ray lines on the face of the tube of indicator 117 to advance toward the center of the tube, whereby indicating a stereophonic transmission. It should be noted that this 19 kc. pilot frequency, transmitted only during stereophonic programs, is utilized both for synchronizing oscillator 107 and for activating indicator 117.

When tuning between stations, hiss and noise signals may be high enough in amplitude to activate indicator 117, just as the 19 kc. pilot does. To preclude operation of indicator 117 by the noise spectrum, a noise immunity circuit 108 is provided wherein a portion of the noise spectrum, i.e., a separated 150 kc. frequency selected from amplifier 102, is rectified by diode CR100, and is fed to amplifier 106. This separated noise signal blocks amplifier 106 completely as long as the noise amplitude is higher than the amplitude of the 19 kc. pilot. However, when the receiver is tuned, the received broadcast signal overrides the noise. In this event, the 150 kc. noise frequency is not high enough in amplitude to block amplifier 106.

Referring to FIG. 8, which forms an extension of FIG. 7, the operation of the multiplex stereo receiver with reference to the reception of the monophonic and stereophonic modes is set by the gang switch 124, which has two positions.

Case 1: For monaural broadcast reception, switch 124 is manually set to the "FM-Monophonic" position. In this relation, the signal from the tuner is transmitted along leads 120 and 130, directly to deemphasis network 121, right and left output amplifiers 125 and 126, and speakers 127 and 128. The monophonic reception from detector 101 bypasses the receiver circuits of FIGS. 6 and 7 completely, and the output of both speakers is the same.

Case 2: With switch 124 manually set to the "FM-Stereo" position, the signal from detector 101 passes through the receiver circuits of FIGS. 6 and 7, but both output signals at terminals 114 and 115 (FIG. 7) are identical. In this instance, the monaural signals from speakers 127 and 128 also are alike, but somewhat degraded from those derived in Case 1.

In Stereophonic Reception, indicator 117 provides an indication that the reception is a stereo broadcast. The presence of the 19 kc. pilot signal furnishes a bias to the grid of the EM84A cathode ray tube, which closes the fluorescent pattern on the face of the CRT tube as an indication that the program is stereophonic.

Referring to FIG. 9, it is intended to depict a modification involving the indicator and recever of FIGS. 6, 7 and 8. In this form, indicator 117 is made to serve an additional function. It is made to operate as a tuning indicator, and also as a stereophonic broadcast indicator, depending on the position of switch 123.

For tuning indication, switch 123 is in the position illustrated in FIG. 9. The incoming station signal is conducted by leads 120 and 122 to indicator 117. For stereophonic programs, indicator 117 is connected, by moving switch 123, to the multiplex adapter circuits of FIGS. 6 and 7.

The operation of the multiplex adapter shown in FIG. 9 with reference to stereophonic and monophonic reception through the operation of switch 124 is described substantially completely in connection with the receiver circuits of FIGS. 6, 7 and 8.

In FIG. 10, there is shown a stereophonic time-division multiplex receiver having a switching arrangement which is responsive substantially only to the absence or presence of a received component of the frequency of the desired pilot carrier, to the exclusion of other spurious and undesired pilot carrier frequency components. The receiver here is shown as following that shown in FIGS. 5 to 8, with certain modifications. For instance, a relay switching arrangement, shown schematically, replaces the CRT indicator of FIGS. 5 to 8. For that reason, parts of FIG. 10 which correspond to parts in FIGS. 5 to 8 have been designated by the same numerals.

In the receiver of FIG. 10, the output of 19 kc. amplifier 106 is applied as the input to grid electrode 146 of a relay amplifier tube 144 through the cathode-to-anode path of a series connected diode 134 and a series connected resistor 136. Parallel connected resistor 138 operates to develop the negative half cycles of voltage produced at the anode of diode 134. Resistor 136 and parallel connected capacitor 140 function to filter these negative half cycles, so that, at junction 137, there is provided a relatively pure negative half-wave rectified sinusoidal input to tube 144.

The B+ operating potential is applied to plate 152 of tube 144 through the operating coil 150 of the operating mode switching relay. Cathode 148 is connected to ground through un-bypassed resistor 153. The output appearing at plate 152 is fed back to junction point 137 through a capacitor 154. A capacitor 152 is shown in dashed line between point 137 and ground, for convenience in further explanation.

In considering the operation of the circuit of FIG. 10, it is appreciated that as to the outputs at terminals 114 and 115, and at the output of 19 kc. amplifier 106, the operation is the same as that described in connection with the receiver of FIGS. 5 to 8. As to the operation of the relay arrangement of FIG. 10, the value of resistor 153 is chosen so that, in the absence of a 19 kc. signal, i.e., in the quiescent state of tube 144, only a small negative operating potential is applied to grid 146. In that state, tube 144 is sufficiently conductive to maintain relay 150 in the energized state, wherein the relay maintains the contacts associated therewith (not shown) in the positions where the receiver operates monophonically. For certain descriptive purposes, the circuit operation is now considered on the basis that capacitor 142 is present in the circuit, and that capacitor 154 is not.

Upon the appearance of a detected 19 kc. signal at the output of 19 kc. amplifier 106, and the consequent train of negative sinusoidal half cycles derived from rectifier 134, the integrated relatively steady negative voltage produced across capacitor 142 through the charging of capacitor 142, eventually attains a value whereby tube 144 is rendered nonconductive, and relay 150 thereby is deenergized. As a consequence, there results switching of the positions of the contacts associated with relay 150, to change the circuits of the receiver into the stereophonic reception mode.

When a detected 19 kc. signal is no longer present, and after the receiver has been operating in the stereophonic mode, and with termination of the reception of a stereophonic transmission, negatively charged capacitor 142 is now permitted to discharge through the combined series connected resistance of resistors 136 and 138. When the point in such discharge is reached where tube 144 has become sufficiently conductive to energize relay 150, the consequent switching of the positions of the contacts associated with relay 150 again places the receiver in the monophonic mode of operation.

In the operation just described, capacitor 142 has been considered as present, and capacitor 154 has been considered as not present. Now the function of feedback capacitor 154 is considered in connection with the waveforms of FIG. 12. For convenience in explanation, the time required to discharge capacitor 142 sufficiently through resistors 136 and 138 to restore conduction in tube 144 is designated as M-S (mono-stereo) time, the capacitance of capacitor 154 is designated as $C_1$, the resistance of resistor 136 is designated as $R_2$, and the resistance of resistor 138 is designated as $R_1$.

The waveform of FIG. 12A shows the negative charging of capacitor 142, in a circuit containing capacitor 142 and not containing capacitor 154. In this waveform, it is seen that the reception of a 19 kc. signal causes capacitor 142 to charge negatively. The dashed line in FIG.

12A, legended "Eg cutoff," indicates the voltage at point 137 necessary to render tube 144 nonconductive. The pedestal of the waveform is legended "Eg max," i.e., the maximum negative voltage to which capacitor 142 is charged when a 19 kc. signal is present. The time, $t_1$, required to render tube 144 nonconductive, i.e., M–S (mono to stereo) from point A to point C, is seen to be quite short. At point B, when the 19 kc. signal is no longer present, capacitor 142 proceeds to discharge as hereinabove explained. At point D, tube 144 is restored to the conductive state. The numeral (1) is applied to indicate the charging curve; the numeral (1') is applied to indicate the discharging curve. The time, $t'_1$, required to bring tube from the nonconductive to the conductive state, is the S–M time (stereo to mono). It is seen that although time $t'_1$ is longer than $t_1$, it is still quite short. The equations which express the values of $t_1$ and $t'_1$ are as follows:

$$t_1 = \tau \ln \left( \frac{1}{1 - \frac{Eg \text{ cutoff}}{Eg \text{ max.}}} \right) \quad (1)$$

and $$t'_1 = \tau \ln \left( \frac{Eg \text{ max.}}{Eg \text{ cutoff}} \right) \quad (2)$$

wherein $\tau \approx R2C2$, for the case where $R1 < R2$.

In the situation where the chosen values of the pertinent components result in $$\frac{Eg \text{ max.}}{Eg \text{ cutoff}} = 3$$

whereby $$\frac{t'_1}{t_1} = 2.8$$

it is seen that the ratio of the S–M time to the M–S time is almost three. As indicated herein, a most important requirement in stereophonic detection is the ability of the relay circuit quickly to change from the stereophonic mode of operation back to the monophonic mode, as the tuning dial is moved. In a circuit in which the waveform of FIG. 12A is one characteristic of the charge on the input capacitor to the relay amplifier tube, the circuit becomes susceptible to being switched into the stereophonic mode of operation by transient and other spurious and unwanted 19 kc. signals because the relative shortness of time $t_1$ may render tube 144 conductive prior to the decay of the transient 19 kc. signal.

FIG. 12B illustrates a waveform for the voltage on capacitor 142 wherein an attempt is made to lengthen $t_1$ by increasing the values of the time constant circuit components, and thereby to prevent switching from the monophonic mode to the stereo mode of operation by transient 19 kc. signals. However, such increase augments $t_1$ only slightly but greatly and undesirably augments $t'_1$ to a point where too long a time is required to switch the receiver from the stereophonic mode, back to the monophonic operation. The waveform of FIG. 12B also results from the use of capacitor 142 instead of capacitor 154.

Now, if capacitor 142 is removed from, and capacitor 154 is included in, the circuit, tube 144 in the quiescent state is conductive as before, with consequent energization of relay 150, and the maintenance of the receiver in the monophonic mode of operation.

If an amplitude modulated, i.e., a transient or spurious 19 kc. pulse, should be passed through tuned filter 105 and amplifier 106, it is negative half-wave rectified, and that rectified half wave is applied to grid 146 through resistor 136. The amplification of the transient pulse in tube 144, and the feeding back of that amplified pulse to grid 146 from plate 152 through capacitor 154, causes a change in the negative direction at the grid side of capacitor 154, and this is opposed by a corresponding and even greater change in the positive direction at the plate side of that capacitor. Accordingly, transient 19 kc. pulses are effectively shorted to ground. The response of the circuit, when it includes capacitor 154 instead of capacitor 142, is equivalent to having a capacitor 142 with a very large value (the capacitance of capacitor 154 multiplied by the amplification factor of tube 144). Another way of explaining the effect when capacitor 154, and not capacitor 142, is present may be by the following equation:

$$C_2' \approx C_2 \cdot A$$

wherein A, the amplification of tube 144, i.e., $$\frac{\mu R_{150}}{R_{150} + r_p + R_{152}(\mu + 1)}$$

conveniently is chosen to be about 10, and $C_2$ is the value of capacitor 154, $C_2'$ indicates the effective capacitive input to the circuit, i.e., that capacitance which has to be negatively charged to render tube 144 nonconductive.

When a steady 19 kc. signal appears, capacitor 154 slowly charges because of its operation as described hereinabove. The provision of the negative voltage at point 137, owing to the action of half wave rectifier 134, causes the plate current to decrease comparatively slowly. Consequently there results a slightly more gradual decreasing of the voltage drop across coil 150, with the consequent larger positive voltage applied to plate 152. In this situation, capacitor 154 charges, as shown in FIG. 12C, driving tube 144 to nonconduction at the end of $t_3$. The time $t_3$ is somewhat longer than $t_1$ of the waveform of FIG. 12A; the difference is negligible. Thus, there is provided a sufficient switching period to permit changing from the monophonic mode to the stereophonic mode of operation; this switching time is, however, of sufficient length to reject transient 19 kc. pulses, and yet to respond to poorly received 19 kc. pulses, and to be relatively rapid.

When the 19 kc. signal terminates, capacitor 154 proceeds to discharge. At this initial moment, tube 144 is at cut-off, so that the effective value of capacitor 154 is no longer greater than its actual value since tube 144 is no function as an amplifier. Capacitor 154 discharges through the internal resistance of tube 144, resistors 138 and 136, and the resistance in the plate circuit of tube 144. Such discharging proceeds in accordance with the discharge curve marked (3') in the wave form of FIG. 12C. It is clear that, in this situation, $t_3'$, the S–M time, is of a desirably short duration, so that rapid switching from the stereophonic mode to the monophonic mode of operation is effected.

In the receiver depicted in FIGS. 2 to 4, it has been shown how 100 kc. amplifier detector stage 33 functioned to block random noise from erratically activating relay stage 34. Similarly, in the receiver of FIGS. 5 to 8, it has been shown how 150 kc. noise detector stage 108 is utilized to prevent random noise from erratically activating CRT indicator 117. In both of the latter instances, the high frequency noise encountered while moving the tuner between stations is rectified, and a given rectified component thereof is utilized to deactivate the automatic switching arrangement of the receiver while it is being tuned. These arrangements have proven normally to be quite effective to prevent random noise from effecting switching between modes of operation in a receiver such as here described.

It hase been found that high frequency random noise rapidly decreases in magnitude just before a station is correctly tuned, i.e., when the receiver is tuned to the sidebands of a station, and such random noise effectively becomes nonexistent when the receiver is tuned to be precisely on station. By contrast, it has also been found that juxtaposed in time with the decrease in random noise amplitude, when the receiver is tuned to a station's sidebands, is the presence of 19 kc. components which exist therein in appreciable strength. Thus the use of in-between station noise to maintain the switching system deactivated, as described in connection with the receivers in FIGS. 2 to 4, and 5 to 8, may at times not be effective to assure that the switching system is so deactivated. The receiver may react to strong 19 kc. components in a station's sidebands, after demodulation, at a time when the high frequency noise voltage is attenuated.

The circuit in FIG. 11 embodies the advantages of the circuit of FIG. 10, in that it prevents the switching arrangement from reacting to transient and spurious 19 kc. signals, and from operating with comparatively short respective "switching in" and "switching out" times. In addition, it also embodies the advantages of preventing the switching arrangement from being actuated while the receiver is tuned to a monophonic station, or to the sidebands of either type station, viz., stereo or monophonic. Thereby it overcomes any possibility that the receiver may be switched from the monophonic mode to the stereophonic mode of operation while it is being tuned to the sidebands of a monophonic station. As will appear further, the latter advantage is accomplished by the use of an AM detector for the 19 kc. signal instead of a high frequency noise detector. The AM detector functions to develop an A.C. signal when the 19 kc. signal is modulated. Since only an "acceptable" stereo station has steady 19 kc. components of at least substantially minimum acceptable amplitudes, the switching arrangement in the receiver will operate to switch from the monophonic mode to the stereo mode of operation only when the receiver is properly tuned to a stereo station which produces at the antenna terminals a signal of sufficient amplitude for good stereo reception. Any other signal containing 19 kc. components, whether they result from interstation noise, station sidebands, or the audio portion of a monophonic broadcast, will not actuate the switching arrangement.

Referring now to FIG. 11, FM detector 101, broad band amplifier 102, SCA lowpass filter 103, double tuned filter 105, 19 kc. amplifier 106, networks 4A and 4B, and the right and left channel output stages correspond to like stages in the receivers depicted in FIGS. 5 to 8 and FIG. 10, and function in the same manner. Accordingly, they have been designated with the same numerals.

The output of 19 kc. amplifier 106 is applied to a 38 kc. oscillator stage 155 which is similar to stage 107 of FIGS. 5 to 8, and is synchronized by the amplified received 19 kc. signal. Oscillator 155 is so constructed, and the values of its circuit components are so arranged, that it is synchronized only by a steady 19 kc. signal preferably of a substantially constant amplitude. Oscillator stage 155 includes an amplifier tube 156 whose cathode resistor 158 is bypassed by a capacitor 159. The value of capacitor 159 is chosen so that it will bypass frequencies of 38 k.c., and accordingly presents a high impedance to audio frequencies. Consequently, audio frequencies will appear at cathode 156 whenever the synchronization of oscillator 155 is disturbed. This will be true whenever the received steady 19 kc. pilot signal is disturbed. This will arise when 19 kc. transients are present at grid 157 of oscillator 155, or in any other case when oscillator 155 is not properly synchronized. The values of the components of oscillator 155 are chosen so that it produces a synchronized 38 kc. output only in response to a steady 19 kc. signal of acceptable amplitude. Thus the appearance of a voltage having audio frequencies across resistor 158 indicates that oscillator 155 has not been synchronized by a properly received 19 kc. pilot signal since only a 19 kc. pilot signal from an "acceptable" stereo station will synchronize oscillator 155 properly and will produce no audio frequency voltage across resistor 158.

The voltage appearing across resistor 158 is filtered by a series connected resistor 160 and a parallel connected grounded capacitor 162. The values of resistor 160 and capacitor 162 are chosen so that together they bypass all components having a frequency of 19 kc., or greater. The filtered output appearing at junction point 161 is applied to grid 168 of relay switch amplifier tube 166. In tube 166, plate 172 is connected to the B+ potential source through the operating coil of the mode switching relay 174. Cathode 170 is grounded.

The output appearing at plate 172 is fed back to grid 168 through a capacitor 176, a resistor 178, and grid resistor 180. One end of resistor 180 is connected to junction 165 of capacitor 164 and grid 168. The junction 179 of resistors 178 and 180 is coupled to ground through a capacitor 182.

In the operation of the feedback loop, a diode 184, connected between plate 172 and ground, functions to clip the negative half cycles of the output from plate 172, which output is being developed across a resistor 186 connected between plate 172 and ground. This train of positive half cycles of voltage is filtered by resistor 178 and capacitor 182, and thence is fed back to grid 168 through resistor 180.

The output of 19 kc. amplifier 106 is also applied through a capacitor 188 and a resistor 190 to junction 179, the junction 189 of capacitor 188 and resistor 190 being grounded through the anode-to-cathode path of a diode 192. Diode 192 operates to clip the positive half cycles passed through capacitor 188 and resistor 190. Capacitor 182 functions to filter the train of negative half cycles appearing at point 189. The filtered voltage, appearing at point 179 and applied to grid 168 through resistor 180, is a negative voltage proportional to the output of 19 kc. amplifier 106.

In considering the operation of the mode switching arrangement of the receiver of FIG. 11, let it be assumed that no steady acceptable 19 kc. pilot signal is being received, but that because of the presence of 19 kc. transients or the presence of 19 kc. components in a monaural station's sidebands, or both, audio frequency voltages appear across resistor 158. Since tube 166 is biased so that it normally conducts in its quiescent state, i.e., in the absence of a received acceptable 19 kc. pilot signal, whereby relay 174 would be energized during monaural reception, the presence of an audio frequency voltage across resistor 158 causes a voltage proportional thereto to be applied and amplified in conducting tube 166, and thus the half wave rectified and filtered voltage, fed back from plate 172 to grid 168 through capacitor 176 and resistors 178 and 180, neutralizes any negative component in the input to grid 168 which might tend to drive tube 166 to be nonconductive, or into a conductive state low enough to deenergize relay 174. Thus, the mode switching arrangement of FIG. 11 insures against incorrect switching from the monophonic mode to the stereo mode in the absence of a received acceptable 19 kc. pilot signal, no matter what undesired 19 kc. components get through amplifier 102, tuned filter 105, and amplifier 106. These undesired 19 kc. components, which appear at junction 179 at this time, are also neutralized by the voltage fed back from plate 172.

In the situation where an acceptable 19 kc. pilot signal is received, i.e., the receiver is being tuned to a stereo station, the filtered negative voltage proportional to the amplified 19 kc. output from 19 kc. amplifier 106, appearing at point 179 and applied to grid 168 through resistor 180, is sufficient to render tube 166 nonconductive. Thereupon, relay 174 is deenergized, and the positions of its contacts (not shown) are switched to place the receiver in the stereo mode of operation. Here, the operation of capacitor 176 is similar to that of capacitor 154 in FIG. 10, in that it is permitted to charge relatively slowly because of the presence of a steady 19 kc. output from amplifier 106, and tube 166 eventually is rendered nonconductive in accordance with the cutoff charging curve (3) as shown in FIG. 12C. During a period when an acceptable 19 kc. pilot signal is being received, oscillator 155 is being synchronized properly, and no audio frequency voltages appear across cathode resistor 158.

It is thus seen that the mode switching arrangement in the receiver of FIG. 11 employs amplitude modulation detection, i.e., the detection of audio frequency signals appearing at cathode 156, to prevent undesired switching from the monophonic mode to the stereo mode of operation since such switching is prevented in the absence of a 19 kc. pilot signal from an acceptable stereo station. Accordingly, it provides delicate discrimination between a pilot signal of sufficient amplitude and duration, and one of insufficient amplitude or produced from noise. It is evident that such amplitude modulation detection may be employed to function as a threshold control which may be utilized to reject "bad" or weak stereo stations since one of the characteristics of a weak stereo station is an amplitude-modulated pilot carrier which may fall below an acceptable minimum amplitude.

Many other changes could be effected in the particular circuits, and in the methods of use and construction, and in specific details thereof, hereinbefore set forth, without substantially departing from the invention intended to be defined herein, the specific description being merely of embodiments capable of illustrating certain principles of the invention.

What is claimed as new and useful is:

1. In a circuit for receiving a signal which may be either stereophonic or monophonic, where the stereophonic signal is derived from a transmitted composite of a control frequency and a high frequency modulated by signals from a pair of distinctly different audio sources, and where the monophonic signal contains errant hiss and noise frequencies, the control frequency being a part of the transmitted composite only when the composite is a stereophonic signal, FM circuit means for separating an audio frequency from the received modulated high frequency, the FM circuit means being operative to produce an audio frequency from the received high frequency whether the received high frequency is stereophonic or monophonic, means for separating the transmitted control frequency, if present, from the high frequency of the received signal, means for utilizing the control frequency after separation from the high frequency to produce separate and distinct audio signals from the separated audio frequency in accordance with the distinct modulation of the high frequency by the separate audio sources, means energized only by the control frequency when the control frequency is present in the transmitted composite for disclosing that the received signal is a stereophonic signal, and means for utilizing a portion of the errant frequencies to block the control frequency separating means to prevent actuation of the signal disclosing means by the errant frequencies.

2. In a circuit for receiving a signal which may be either stereophonic or monophonic, where the stereophonic signal is derived from a transmitted composite of a control frequency and a high frequency modulated by signals from a pair of distinctly different audio sources, and where the monophonic signal contains errant hiss and noise frequencies, the control frequency being a part of the transmitted composite only when the composite is a stereophonic signal, means for separating an audio frequency from the received modulated high frequency, the audio frequency separating means being operative to produce an audio frequency from the received high frequency whether the received high frequency is stereophonic or monophonic, means for filtering the received high frequency to separate the transmitted control frequency, if present, from the audio frequency of the received high frequency, means for deriving a demodulating frequency from the separated control frequency, means for utilizing the derived demodulating frequency to produce separate and distinct audio signals from the separated audio frequency in accordance with the distinct modulation of the high frequency by the separate audio sources, cathode ray means energized only by the control frequency when the control frequency is present in the transmitted composite for disclosing that the received signal is a stereophonic signal, and means for utilizing a portion of the errant frequencies to block the control frequency separating means, the blocking means being coupled to the cathode ray means to prevent actuation of the cathode ray means by the errant frequencies.

3. In a receiver adapted to be operated in both the stereophonic and monophonic modes of operation and to be placed in one of said modes of operation automatically in response to the reception of stereophonic and monophonic signals, respectively, said stereophonic signals comprising a composite of a steady control component having a chosen frequency and a high frequency component modulated by the outputs of at least two discrete audio sources, said monophonic signals comprising a high frequency component modulated by the output of a single audio source; means including an amplifier having a control electrode and an output, said means being responsive to the reception of said signals for separating said control component from said stereophonic signals, switching means including a switching device capable of being in one of two states, said switching device being constructed to be in one of said states in the absence of the steady control component in the received signal and to be switched to the other of said states in response to the presence of the steady control component in the received signal; said switching means including means responsive to the application thereto of said control component for deriving a unidirectional voltage of a given polarity, means for applying said unidirectional voltage to said switching device to place it in said other state; and means responsive to the application of a unidirectional voltage of said polarity derived from a transient signal for generating a voltage having a polarity to oppose the polarity of the voltage derived from said transient signal and to apply said voltage to the control electrode of the amplifier to deactivate the amplifier to prevent placing said switching device into said other state.

4. In a receiver adapted to be operated in both the stereophonic and monophonic modes of operation and to be placed in one of said modes of operation automatically in response to the reception of stereophonic and monophonic signals, respectively, said stereophonic signals comprising a composite of a steady control component having a chosen frequency and a high frequency component modulated by the outputs of at least two discrete audio sources, said monophonic signals comprising a high frequency component modulated by the output of a single audio source; means responsive to the reception of said signals for separating said control component from said stereophonic signals, switching means including means responsive to the application thereto of said control component for deriving therefrom a unidirectional voltage of a given polarity, a series combination of a relay capable of being either in an energized state or in a deenergized state, and an active device adapted to be connected to a potential source, said series combination being constructed to maintain said relay in one of said states in the absence of reception of said stereophonic signals; and time constant means for applying said unidirectional voltage to said active device at a given rate and to feed back the output of said active device in a polarity to oppose said given polarity, said time constant means by means of the opposing polarity causing said relay to switch to the other of said states only after a prescribed time period as determined by a selected integrated value of said applied unidirectional voltage, or to prevent such switching where said unidirectional voltage is derived from other than said steady control component.

5. In a receiver adapted to be operated in both the stereophonic and monophonic modes of operation and to be placed in one of said modes of operation automatically in response to the reception of stereophonic and monophonic signals, respectively, said stereophonic signals comprising a composite of a steady control component having a chosen frequency and a high frequency component modulated by the outputs of at least two discrete audio sources, said monophonic signals comprising a high frequency component modulated by the output of a single audio source; means responsive to the reception of said signals for separating said control component from said stereophonic signals, switching means including means responsive to the application thereto said control component for deriving therefrom a unidirectional voltage of a given polarity, a series combination of a relay capable of being either in an energized state or in a deenergized state, and an active device adapted to be connected to a potential source, said given polarity being in a direction to drive said active device toward the non-conductive state when applied thereto, said series combination being constructed to maintain said relay in the energized state and said active device in the conductive state in the absence of received stereophonic signals; and time constant means for applying said unidirectional voltage to said active device at a given rate and to feed back the output of said active device in a polarity to oppose said given polarity, said time constant means by means of the opposing polarity causing said relay to switch to the other of said states only after a prescribed time period as determined by a selected integrated value of said applied unidirectional voltage, or to prevent such switching where said unidirectional voltage is derived from other than said steady control component.

6. In a receiver adapted to be operated in both the stereophonic and monophonic modes of operation and to be placed in one of said modes of operation automatically in response to the reception of stereophonic and monophonic signals, respectively, said stereophonic signals comprising a composite of a steady control component having a chosen frequency and a high frequency component modulated by the outputs of at least two discrete audio sources said monophonic signals comprising a high frequency component modulated by the output of a single audio source; means responsive to the reception of said signals for separating said control component from said stereophonic signals, switching means including means responsive to the application thereto of said control component for deriving therefrom a unidirectional voltage of a given polarity, a series combination of a relay capable of being either in an energized state or in a deenergized state, and an active device adapted to be connected to a potential source, said given polarity being in a direction to drive said active device toward the nonconductive state when applied thereto, said series combination being constructed to maintain said relay in the energized state and said active device in the conductive state in the absence of received stereophonic signals; and time constant means for applying said unidirectional voltage to said active device at a given rate and to feed back the output of said active device in a polarity to oppose said given polarity, said time constant means by means of the opposing polarity causing said relay to switch to the other of said states only after a prescribed time period as determined by a selected integrated value of said applied unidirectional voltage chosen to be sufficient to overcome said fed back voltage thereby to drive said active device toward the nonconductive state sufficiently to deenergize said relay upon the reception of said stereophonic signals, or to prevent such switching where said unidirectional voltage is derived from other than said steady control component.

7. In a receiver adapted to be operated in both the stereophonic and monophonic modes of operation and to be placed into one of said modes of operation automatically in response to the reception of stereophonic and monophonic signals, respectively, said stereophonic signals comprising a composite of a steady control component having a chosen frequency and at least a selected amplitude and a high frequency component modulated by the outputs of at least two discrete audio sources, said monophonic signals comprising a high frequency component modulated by the output of a single audio source; means responsive to the reception of said signals for separating said control component from said stereophonic signals, means responsive to the application thereto of said steady selected amplitude control component for generating a first and demodulating frequency output in synchronism with said control component; the responsive means also being responsive to a second output derived from an unsynchronized portion of the first output; means responsive to the application thereto of said synchronized subcarrier frequency output for discretely producing the separate audio components from said composite, switching means comprising a series combination adapted to be connected to a potential source, said series combination having a relay capable of being either in an energized state or in a deenergized state, and an active device, said series combination being constructed to maintain said relay in one of said states in the absence of the reception of said stereophonic signals, means responsive to the application thereto of said received control component for deriving a unidirectional voltage of a given polarity and for applying said voltage to said active device to place said relay in the other of said states, means for applying said second output to said active device, and means for feeding back the output of said active device in a polarity opposite to the polarity of the input applied thereto to oppose said second output and said unidirectional voltage, said feed-back means providing means controlling switching by the relay to the other of said states so that such switching will occur only when the applied unidirectional voltage is derived from a received steady control component having at least said selected amplitude.

8. In a receiver adapted to be operated in both the stereophonic and monophonic modes of operation and to be placed into one of said modes of operation automatically in response to the reception of stereophonic and monophonic signals, respectively, said stereophonic signals comprising a composite of a steady control component having a chosen frequency and at least a selected amplitude and a high frequency component modulated by the outputs of at least two discrete audio sources, said monophonic signals comprising a high frequency component modulated by the output of a single audio source; means responsive to the reception of said signals for separating said control component from said stereophonic signals, means responsive to the application thereto of said steady selected amplitude control component for generating a first and demodulating frequency output in synchronism with said control component; the responsive means also being responsive to a second output derived from an unsynchronized portion of the first output; means responsive to the application thereto of said synchronized subcarrier frequency output for discretely producing the separate audio components from said composite, switching means comprising a series combination adapted to be connected to a potential source, said series combination having a relay capable of being either in an energized state or in a deenergized state, said series combination being constructed to maintain said relay in one of said states in the absence of the reception of said stereophonic signals, means responsive to the application thereto of said received control component for deriving a unidirectional voltage of a given polarity, time constant means for applying said unidirectional voltage and said second output to said active device at a given rate and to feed back the output of said active device in a polarity to oppose said given polarity, said time constant means providing means controlling switching by the relay to the other of said states so that such switching will occur only when the applied unidirectional voltage is derived from a received steady control component having at least said selected amplitude.

9. In a receiver adapted to be operated in both the stereophonic and monophonic modes of operation and to be placed into one of said modes of operation automatically in response to the reception of stereophonic and monophonic signals, respectively, said stereophonic signals comprising a composite of a steady control component having a chosen frequency and at least a selected amplitude and a high frequency component modulated by the outputs of at least two discrete audio sources, said monophonic signals comprising a high frequency component modulated by the output of a single audio source; means responsive to the reception of said signals for separating said control component from said stereophonic signals, means responsive to the application thereto of said steady selected amplitude control component for generating a first and demodulating frequency output in synchronism with said control component; the responsive means also being responsive to a second output derived from an unsynchronized portion of the first output; said generating means comprising an oscillator in circuit with said steady control component separating means and including an active device having an input electrode, a first output electrode at which said demodulating frequency appears, and a second output electrode at which said second output appears, said second output electrode having filter means associated therewith for bypassing components of said second output which exceed a selected frequency, means responsive to the application thereto of said synchronized demodulating frequency output for discretely producing the separate audio components from said composite, switching means comprising a series combination adapted to be connected to a potential source, said series combination having a relay capable of being either in an energized state or in a deenergized state, said series combination being constructed to maintain said relay in one of said states in the absence of the reception of said stereophonic signals, means responsive to the application thereto of said received control component for deriving a unidirectional voltage of a given polarity, time constant means for applying said unidirectional voltage and said second output to said active device at a given rate and to feed back the output of said active device in a polarity to oppose said given polarity, said time constant means providing means controlling switching by the relay to the other of said states so that such switching will occur only when the applied unidirectional voltage is derived from a received steady control component having at least said selected amplitude.

10. In a receiver adapted to be operated in both the stereophonic and monophonic modes of operation and to be placed into one of said modes of operation automatically in response to the reception of stereophonic and monophonic signals, respectively, said stereophonic signals comprising a composite of a steady control component having a chosen frequency and at least a selected amplitude and a high frequency component modulated by the outputs of at least two discrete audio sources, said monophonic signals comprising a high frequency component modulated by the output of a single audio source; means responsive to the reception of said signals for separating said control component from said stereophonic signals, means responsive to the application thereto of said steady selected amplitude control component for generating a first and demodulating frequency output in synchronism with said control component; the responsive means also being responsive to a second output derived from an unsynchronized portion of the first output; means responsive to the application thereto of said synchronized demodulating frequency output for discretely producing the separate audio components from said composite, switching means comprising a series combination adapted to be connected to a potential source, said series combination having a relay capable of being either in an energized state or in a deenergized state, said series combination being constructed to maintain said relay in the energized state and the active device in the conductive state in the absence of said received stereophonic signals, means responsive to the application thereto of said received control component for deriving a unidirectional voltage of a given polarity, time constant means for applying said unidirectional voltage and said second output to said active device at a given rate and in a direction to drive said active device toward the nonconductive state and to feed back the output of said active device in a polarity to oppose said given polarity, said time constant means providing means controlling switching by the relay to the other of said states so that such switching will occur only when the applied unidirectional voltage is derived from a received steady control component having at least said selected amplitude.

11. In a receiver adapted to be operated in both the stereophonic and monophonic modes of operation and to be placed into one of said modes of operation automatically in response to the reception of stereophonic and monophonic signals, respectively, said stereophonic signals comprising a composite of a steady control component having a chosen frequency and at least a selected amplitude and a high frequency component modulated by the outputs of at least two discrete audio sources, said monophonic signals comprising a high frequency component modulated by the output of a single audio source; means responsive to the reception of said signals for separating said control component from said stereophonic signals, means responsive to the application thereto of said steady selected amplitude control component for generating a first and demodulating frequency output in synchronism with said control component; the responsive means also being responsive to a second output derived from an unsynchronized portion of the first output; means responsive to the application thereto of said synchronized demodulating frequency output for discretely producing the separate audio components from said composite, switching means comprising a series combination adapted to be connected to a potential source, said series combination having a relay capable of being either in an energized state or in a deenergized state, said series combination being constructed to maintain said relay in the energized state and the active device in the conductive state in the absence of said received stereophonic signals, means responsive to the application thereto of said received control component for deriving a unidirectional voltage of a given polarity, time constant means for applying said unidirectional voltage and said second output to said active device at a given rate and in a direction to drive said active device toward the nonconductive state and to feed back the output of said active device in a polarity to oppose said given polarity, said time constant means providing means controlling switching by the relay to the other of said states so that such switching will occur only when the applied unidirectional voltage is derived from a received steady control component having at least said selected amplitude, the value of said unidirectional voltage derived from said selected amplitude as integrated by said time constant means being chosen to be sufficient to overcome said feedback output and thereby to deenergize said relay.

12. In a circuit for receiving and selectively separating the received signals of any one of a plurality of transmitted modulated carriers where any one or more of the received signals may be stereophonic and others only monophonic, where each stereophonic signal is derived from a transmitted composite of a control frequency and a high frequency modulated by signals from a pair of distinctly different audio sources, the control frequency being a part of the transmitted composite only when the composite is a stereophonic signal, means for separating an audio frequency from the modulated high frequency of each distinct received and separated signal, the audio frequency separating means being operative to produce an audio signal from the received high frequency whether the received signal is stereophonic or monophonic, means for amplifying and utilizing the amplified audio signal to drive at least a pair of transducers, means for separating the transmitted control frequency, if present, from the high frequency of that distinct received and separated signal, means for utilizing the control frequency after separation from the high frequency to produce separate and distinct audio signals from the separated audio frequency in accordance with the distinct modulation of the high frequency by the separate audio sources, means energized only by the control frequency when the control frequency is present in the transmitted composite for switching the separate and distinct audio signals to drive separate ones of the pair of transducers when the received signal is a stereophonic signal, the switching means including an amplifier having an output, the amplifier being in circuit with the means for separating the transmitted control frequency, means energized by the output of the amplifier under actuation of the separated transmitted control frequency to cause switching of the connections of the transducers from simultaneous energization by the same audio signal as produced from the received high frequency transmission to separately energize each transducer by a separate and distinct audio signal, means for impressing upon the electrode of the input of the amplifier to deactivate the amplifier a voltage derived from at least a portion of transient signals when the control frequency is not present as the receiving and selectively separating circuit is made effective upon one received signal after another, the impressing means being constructed to become ineffective when the control frequency is present and is properly separated and its resultant voltage is applied to the amplifier to overcome the voltage derived from the transient signals.

13. In a circuit for receiving and selectively separating the received signals of any one of a plurality of transmitted modulated carriers where any one or more of the received signals may be stereophonic and others only monophonic, where each stereophonic signal is derived from a transmitted composite of a control frequency and a high frequency modulated by signals from a pair of distinctly different audio sources, the control frequency being a part of the transmitted composite only when the composite is a stereophonic signal, means for separating an audio frequency from the modulated high frequency of each distinct received and separated signal, the audio frequency separating means being operative to produce an audio signal from the received high frequency whether the received signal is stereophonic or monophonic, means for amplifying and utilizing the amplified audio signal to drive at least a pair of transducers, means for separating the transmitted control frequency, if present, from the high frequency of that distinct received and separated signal, means for utilizing the control frequency after separation from the high frequency to produce separate and distinct audio signals from the separated audio frequency in accordance with the distinct modulation of the high frequency by the separate audio sources, means energized only by the control frequency when the control frequency is present in the transmitted composite for switching the separate and distinct audio signals to drive separate ones of the pair of transducers and to actuate an indicator to announce the presence of the control frequency when the received signal is a stereophonic signal, the switching means including an amplifier having an output, the amplifier being in circuit with the means for separating the transmitted control frequency, means energized by the output of the amplifier under actuation of the separated transmitted control frequency to cause switching of the connections of the transducers from simultaneous energization by the same audio signal as produced from the received high frequency transmission to separately energize each transducer by a separate and distinct audio signal and to actuate the indicator, means for impressing upon the electrode of the input of the amplifier to deactivate the amplifier a voltage derived from at least a portion of transient signals when the control frequency is not present as the receiving and selectively separating circuit is made effective upon one received signal after another, the impressing means being constructed to become ineffective when the control frequency is present and is properly separated and its resultant voltage is applied to the amplifier to overcome the voltage derived from the transient signals.

14. In a circuit for receiving and selectively separating the received signals of any one of a plurality of transmitted modulated carriers where any one or more of the received signals may be stereophonic and others only monophonic, where each stereophonic signal is derived from a transmitted composite of a control frequency and a high frequency modulated by signals from a pair of distinctly different audio sources, the control frequency being a part of the transmitted composite only when the composite is a stereophonic signal, means for separating an audio frequency from the modulated high frequency of each distinct received and separated signal, the audio frequency separating means being operative to produce an audio signal from the received high frequency whether the received signal is stereophonic or monophonic, means for amplifying and utilizing the amplified audio signal to drive at least a pair of transducers, means for separating the transmitted control frequency, if present, from the high frequency of that distinct received and separated signal, means for utilizing the control frequency after separation from the high frequency to produce separate and distinct audio signals from the separated audio frequency in accordance with the distinct modulation of the high frequency by the separate audio sources, means energized only by the control frequency when the control frequency is present in the transmitted composite to actuate an indicator to announce the presence of the control frequency when the received signal is a stereophonic signal, the energized means including an amplifier having an output, the amplifier being in circuit with the means for separating the transmitted control frequency, means energized by the output of the amplifier under actuation of the separated transmitted control frequency to cause actuation of the indicator when the control frequency is present, means for impressing upon the electrode of the input of the amplifier to deactivate the amplifier a voltage derived from at least a portion of transient signals when the control frequency is not present as the receiving and selectively separating circuit is made effective upon one received signal after another, the impressing means being constructed to become effectively when the control frequency is present and is properly separated and its resultant voltage is applied to the amplifier to overcome the voltage derived from the transient signals.

15. In a circuit for receiving and selectively separating the received signals of any one of a plurality of transmitted modulated carriers where any one or more of the received signals may be stereophonic and others only monophonic, where each stereophonic signal is derived from a transmitted composite of a control frequency and a high frequency modulated by signals from a pair of distinctly different audio sources, the control frequency being a part of the transmitted composite only when the composite is a stereophonic signal, means for separating an audio frequency from the modulated high frequency of each distinct received and separated signal, the audio frequency separating means being operative to produce an audio signal from the received high frequency whether the received signal is stereophonic or monophonic, means for amplifying and utilizing the amplified audio signal to drive at least a pair of transducers, means for separating the transmitted control frequency, if present, from the high frequency of that distinct received and separated signal, means for amplifying the separated control frequency, means for utilizing the control frequency after separation from the high frequency to produce separate and distinct audio signals from the separated audio frequency in accordance with the distinct modulation of the high frequency by the separate audio sources, means energized only by the output of the amplifying means when the control frequency is present in the transmitted composite to actuate an indicator to announce the presence of the control frequency when the received signal is a stereophonic signal, and means for deriving a voltage from a separated part of the noise spectrum of the transient signals on operation of the receiving and selectively separating circuit to be made effective upon one received signal after another and impressing that voltage on the input electrode of the amplifying means to make the amplifying means ineffective.

16. In a circuit for receiving and selectively separating the received signals of any one of a plurality of transmitted modulated carriers where any one or more of the received signals may be stereophonic and others only monophonic, where each stereophonic signal is derived from a transmitted composite of a control frequency and a high frequency modulated by signals from a pair of distinctly different audio sources, the control frequency being a part of the transmitted composite only when the composite is a stereophonic signal, means for separating an audio frequency from the modulated high frequency of each distinct received and separated signal, the audio frequency separating means being operative to produce an audio signal from the received high frequency whether the received signal is stereophonic or monophonic, means for amplifying and utilizing the amplified audio signal to drive at least a pair of transducers, means for separating the transmitted control frequency, if present, from the high frequency of that distinct received and separated signal, means for amplifying the separated control frequency, means for utilizing the control frequency after separation from the high frequency to produce separate and distinct audio signals from the separated audio frequency in accordance with the distinct modulation of the high frequency by the separate audio sources, means energized only by the output of the amplifying means when the control frequency is present in the transmitted composite for switching the separate and distinct audio signals to drive separate ones of the pair of transducers when the received signal is a stereophonic signal, the switching means including an amplifier having an output, the amplifier being in circuit with the means for separating the transmitted control frequency, means energized by the output of the amplifier under actuation of the separated transmitted control frequency to cause switching of the connections of the transducers from simultaneous energization by the same audio signal as produced from the received high frequency transmission to separately energize each transducer by a separate and distinct audio signal, means for impressing upon the electrode of the input of the amplifier to deactivate the amplifier a voltage in reverse phase as derived from transient signals when the control frequency is not present as the receiving and selectively separating circuit is made effective upon one received signal after another, the impressing means being constructed to become ineffective when the control frequency is present and is properly separated and its resultant voltage is applied to the amplifier to overcome the voltage derived from the transient signals.

17. In a circuit for receiving and selectively separating the received signals of any one of a plurality of transmitted modulated carriers where any one or more of the received signals may be stereophonic and others only monophonic, where each stereophonic signal is derived from a transmitted composite of a control frequency and a high frequency modulated by signals from a pair of distinctly different audio sources, the control frequency being a part of the transmitted composite only when the composite is a stereophonic signal, means for separating an audio frequency from the modulated high frequency of each distinct received and separated signal, the audio frequency separating means being operative to produce an audio signal from the received high frequency whether the received signal is stereophonic or monophonic, means for amplifying and utilizing the amplified audio signal to drive at least a pair of transducers, means for separating the transmitted control frequency, if present, from the high frequency of that distinct received and separated signal, means for amplifying the separated control frequency, means for utilizing the control frequency after separation from the high frequency to produce separate and distinct audio signals from the separated audio frequency in accordance with the distinct modulation of the high frequency by the separate audio sources, means energized only by the output of the amplifying means when the control frequency is present in the transmitted composite for switching the separate and distinct audio signals to drive separate ones of the pair of transducers when the received signal is a stereophonic signal, the switching means including an amplifier having an output, the input electrode of the amplifier being connected to the output of the means for separating the transmitted control frequency, means energized by the output of the amplifier under actuation of the separated transmitted control frequency to cause switching of the connections of the transducers from simultaneous energization by the same audio signal as produced from the received high frequency transmission to separately energize each transducer by a separate and distinct audio signal, means for impressing upon the electrode of the input of the amplifier to deactivate the amplifier a voltage in reverse phase as derived from transient signals when the control frequency is not present as the receiving and selectively separating circuit is made effective upon one received signal after another, and a capacitor connected from between the connection of the input of the amplifier and the output of the means for separating the transmitted control frequency to between the output of the amplifier and the means energized by the output of the amplifier to delay making the amplifier conductive when the control frequency is present to make the amplifier non-conductive when transient signals are present.

18. In a circuit for receiving a signal which may be either stereophonic or monophonic, where the stereophonic signal is derived from a transmitted composite of a control frequency and a high frequency modulated by signals from a pair of distinctly different audio sources, and where the monophonic signal is a high frequency modulated by a signal from a single audio source and may contain errant hiss and noise frequencies, the control frequency being a part of the transmitted composite only when the composite is a stereophonic signal, FM circuit means for separating an audio frequency from the received modulated high frequency, the FM circuit means constituting means to separate an audio frequency from the received high frequency whether the received high frequency is stereophonic or monophonic, means for separating the transmitted control frequency, if present, from the transmitted composite of the received signal, means for applying the control frequency after separation from the received signal to the separated audio frequency to produce separate and distinct audio signals corresponding to the distinct modulation of the transmitted high frequency, a pair of sound reproduction circuits each of which includes an amplifier and a transducer, two-state means for controlling the reproduction circuits so that in one state each reproduction circuit will reproduce from a separate and distinct audio signal, and in the other state both reproduction circuits will reproduce the same single audio signal, a circuit for energizing the controlling means, said circuit including an amplifier, the energizing circuit comprising means which when the control frequency is present and separated will control the reproduction circuits so that they will each reproduce from a separate and distinct audio signal in the separate reproduction circuits, and means for converting at least a portion of the errant hiss and noise frequencies to a potential and applying that potential to the energizing circuit to make the controlling means ineffective to cause the reproduction circuits to be energized to the state where each of the reproduction circuits will be reproducing from a separate and distinct audio signal.

19. A stereophonic and monophonic receiving circuit, as set forth in claim 18, said controlling means being switching means for switching the sound reproduction circuits back and forth from the state in which each reproduction circuit is individually energized by a single individual and separate and distinct audio signal, and the state where both reproduction circuits are energized from a single audio signal, and where the hiss and noise frequencies are converted to a positive potential.

20. A stereophonic and monophonic receiving circuit, as set forth in claim 19, said receiving circuit having an additional amplifier having a control electrode, said control electrode being connected to the output of the energizing circuit amplifier, the energizing circuit for the switching means including a relay, the relay being in the output circuit of the additional amplifier.

21. A stereophonic and monophonic receiving circuit, as set forth in claim 19, an amplifier for the separated control frequency, the means for converting at least a portion of the errant hiss and noise frequencies being connected to the amplifier for the separated control frequency, said receiving circuit having an additional amplifier having a control electrode, said control electrode being connected to the output of the amplifier for the separated control frequency, the energizing circuit for the switching means including a relay, the relay being in the output circuit of the additional amplifier.

22. A stereophonic and monophonic receiving circuit, as set forth in claim 19, an amplifier for the separated control frequency, the means for converting at least a portion of the errant hiss and noise frequencies being connected to the amplifier for the separated control frequency, said receiving circuit having an additional amplifier having a control electrode, said control electrode being connected to the output of the amplifier for the separated control frequency, the energizing circuit for the switching means including a relay, the relay being in the output circuit of the additional amplifier, and a capacitance connected between the control electrode and the output of the additional amplifier.

References Cited by the Examiner

UNITED STATES PATENTS

| 3,070,662 | 12/1962 | Eilers | 179—15 |
| 3,105,117 | 9/1963 | Frank | 179—15 |
| 3,116,372 | 12/1963 | Wolff | 179—15 |
| 3,122,610 | 2/1964 | Csicsatka | 179—15 |
| 3,124,653 | 3/1964 | Schroeder | 179—15 |
| 3,125,641 | 3/1964 | Recklinghausen | 179—15 |
| 3,133,993 | 5/1964 | De Vries | 179—15 |
| 3,176,075 | 3/1965 | Bially | 179—15 |
| 3,206,550 | 9/1965 | Fink | 179—15 |
| 3,225,143 | 12/1965 | Parker | 179—15 |
| 3,242,264 | 3/1966 | De Vries | 179—15 |

DAVID G. REDINBAUGH, *Primary Examiner.*

R. L. GRIFFIN, *Assistant Examiner.*